(12) United States Patent
Hayward et al.

(10) Patent No.: US 8,252,426 B2
(45) Date of Patent: Aug. 28, 2012

(54) MODIFICATION OF WOOD WITH HYDROPHILIC PREPOLYMERS

(75) Inventors: Peter James Hayward, New Plymouth (NZ); Wallace James Rae, New Plymouth (NZ); Christopher Molloy, New Plymouth (NZ)

(73) Assignee: Zelam Limited, New Plymouth (NZ)

( * ) Notice: Subject to any disclaimer, the term of this patent is extended or adjusted under 35 U.S.C. 154(b) by 459 days.

(21) Appl. No.: 12/517,150

(22) PCT Filed: Dec. 4, 2007

(86) PCT No.: PCT/NZ2007/000352

§ 371 (c)(1),
(2), (4) Date: Jun. 1, 2009

(87) PCT Pub. No.: WO2008/069684
PCT Pub. Date: Jun. 12, 2008

(65) Prior Publication Data
US 2010/0068543 A1 Mar. 18, 2010

(30) Foreign Application Priority Data
Dec. 4, 2006 (NZ) ........................................ 551766

(51) Int. Cl.
*B03B 23/04* (2006.01)
(52) U.S. Cl. ...................... 428/532; 428/537.1; 523/122
(58) Field of Classification Search .................. 428/532, 428/537.1; 523/122
See application file for complete search history.

(56) References Cited

U.S. PATENT DOCUMENTS

| | | | |
|---|---|---|---|
| 4,129,488 A | 12/1978 | McGinniss | |
| 5,210,111 A | 5/1993 | Goldenberg et al. | |
| 5,334,640 A | 8/1994 | Desai et al. | |
| 5,770,319 A | 6/1998 | Franich et al. | |
| 7,008,984 B2 | 3/2006 | Schneider | |
| 7,691,444 B2 * | 4/2010 | Hayward et al. | 427/255.25 |
| 2005/0170165 A1 | 8/2005 | Westin | |

FOREIGN PATENT DOCUMENTS

| | | | |
|---|---|---|---|
| DE | 3103499 A1 | | 8/1982 |
| EP | 0502640 A1 | | 9/1992 |
| JP | 60061205 | * | 4/1885 |
| JP | 60-61205 A | | 4/1985 |
| JP | 05-220712 A | | 8/1993 |
| JP | 05220712 | * | 8/1993 |
| NZ | 235036 A | | 8/1994 |
| WO | 2006/117159 A1 | | 11/2006 |
| WO | 2006/117162 A2 | | 11/2006 |
| WO | WO2006117159 | * | 11/2006 |
| WO | WO2006117162 | * | 11/2006 |

OTHER PUBLICATIONS

International Search Report for PCT/NZ2007/000352.
Doyle et al., Indentation Hardness of Wood, Jul. 1985, Wood and Fiber Science, vol. 17, No. 3, pp. 369-376.
Franich et al., Enhancement of Lignocellulosic Material Stiffness Properties with Chitosan Oligomer-Methylolmelamine Co-Polymer, 2005, Proceedings of the 13th ISWFPC, pp. 73-79.
Grindl et al., Using a Water-Soluble Melamine-Formaldehyde Resin to Improve the Hardness of Norway Spruce Wood, 2004, Journal of Applied Polymer Science, vol. 93, pp. 1900-1907.
Lukowsky, Influence of the Formaldehyde Content of Waterbased Melamine Formaldehyde Resins on Physical Properties of Scots Pine Impregnated Therewith, 2002, Holz als Roh- and Werkstoff, vol. 60, pp. 349-355.
Magalhaes et al., Treatment of Caribbean Pine by in Situ Polymerization of Styrene and Furfuryl Alcohol, 2004, Journal of Applied Polymer Science, vol. 91, pp. 1763-1769.
Norimoto et al., Rheological Properties of Chemically Modified Wood: Relationship Between Dimensional and Creep Stability, Jan. 1992, Wood and Fiber Science, vol. 24, No. 1, pp. 25-35.

* cited by examiner

*Primary Examiner* — Leszek Kiliman
(74) *Attorney, Agent, or Firm* — Brooks Kushman P.C.

(57) ABSTRACT

A composition for modification of wood products is disclosed. The composition contains a prepolymer formed by the reaction of a polyfunctional hydrophilic polymer of high molecular weight and a crosslinking agent. The composition may also contain a prepolymer formed by the reaction of a sugar and a crosslinking agent. Modification of the wood product may result in one or more of: improved stiffness, strength, surface hardness, dimensional stability, water resistance, flame retardancy, and biological resistance.

20 Claims, 8 Drawing Sheets

MODIFICATION OF WOOD WITH HYDROPHILIC PREPOLYMERS

FIELD OF THE INVENTION

This invention relates to the preparation and use of compositions for modification of wood products, including wood, engineered wood products, reconstituted wood products, wood plastic composites and the like.

BACKGROUND TO THE INVENTION

Timber construction systems for dwellings and furniture are simple, rapid and cost competitive compared to most other construction systems. Timber (also called lumber) is highly anisotropic, with excellent longitudinal strength but poor resistance to bending and impaction in transverse directions. Further shortcomings of solid timber, or lumber, are flammability, susceptibility to rot and insect damage, and deformation, the latter problems being exacerbated by water uptake.

Engineered wood products such as plywood or laminated veneer lumber (LVL), and reconstituted board products such as oriented strand board (OSB) and medium density fibreboard (MDF), are glued composites of wood veneers, strands and fibres respectively. Such products are designed to help overcome some of the shortcomings of timber.

A feature of engineered or reconstituted wood products is the alignment or re-orientation of veneers, strands or fibres, and the introduction of glues, resins and waxes, to improve properties such as strength, hardness and dimensional stability in order to match the performance requirements of specific applications. However, these modifications in turn introduce new problems such as creep in MDF.

To alleviate the shortcomings mentioned above there is a need to modify wood and further modify engineered and reconstituted board products, or their components, in order to improve physical properties such as fire retardancy, strength, surface hardness, dimensional stability, water resistance, UV resistance and durability with respect to rot and insect damage (biological resistance). At least some of these improvements may be linked.

These improvements in the properties of wood may be achieved in a number of ways including chemical treatment, heating and compression.

Conventional improvements have been restricted to improving the resistance to rot or insect attack by the inclusion of water borne or solvent borne chemical systems either by dipping, spraying or the application of vacuum and/or pressure. These systems generally rely on filling of the wood cell lumen and sometimes also the cell wall with the chemical system which is fixed partially or completely to the cellulose and hemicellulose of the wood.

In order to improve physical properties such as strength, hardness or dimensional stability it is necessary to bring about more significant changes. One instance is by the introduction of chemicals capable of derivitization, or polymerisation and/or crosslinking. For example Norimoto et al. (1992. Wood and Fiber Science 24, 25-35) teach that a chemical treatment such as this must result in filling of the cell lumen and/or modification of cell wall material. Ideally lumen modification will include good interfacial adhesion and cell wall modification will include covalent crosslinking of introduced materials to the cellulose, hemicellulose or lignin constituents.

Furthermore requirements are that the chemical modification retains the characteristic colour, workability and glueability of the native wood without excessive densification, that the method of treatment is compatible with manufacturing processes for engineered or reconstituted wood products, and that the treatment composition utilises materials that are cheap, abundant and sustainably produced.

Known in the prior art is the simple approach of impregnating wood or engineered wood products with one or more resins soluble in water or water-miscible solvents followed by polymerisation in situ, generally brought about by heat.

Gindl et al. (2004. Journal of Applied Polymer Science 93, 1900-1907) teach the use of aqueous 30% melamine-formaldehyde to increase the surface hardness of Norway spruce wood to that typical of hardwood beech. An important disadvantage is the complexity or duration of the treatments, i.e. vacuum impregnation repeated three times over 10 minutes or, more effective, a 3 day solvent exchange process applied to water saturated timber.

Lukowsky (2002. Holz als Roh- and Werkstoff 60, 349-355) demonstrated only modest improvements in dimensional stability and water resistance in Scots pine solid wood vacuum impregnated with melamine-formaldehyde resins. Dimensional stabilisation and cell wall penetration were inversely related to the molecular weight or degree of condensation of the resins.

US patent 2005/0170165 discloses full cell impregnation of softwoods with furfuryl alcohol monomer mixtures followed by heat curing. The treatment produces markedly increased resistance to microbial decay but only slightly increased hardness, bending strength and elasticity, and decreased impact resistance.

U.S. Pat. No. 7,008,984 discloses a related treatment process that also increases biological resistance but with excessively high densification (68%-80% weight gain) for many applications.

Magalhaes and Silva (2002. Journal of Applied Polymer Science 91, 1763-1769) teach that treatment with furfuryl alcohol, which is hydrophilic and compatible with polar wood macromolecules, provides good cell wall penetration, resulting in increased dimensional stability, whereas treatment with polystyrene, which is hydrophobic, fills the cell lumen and provides good cell adherence, producing significantly improved water repellency. Unfortunately both resins, when applied together or in sequence, polymerise poorly and do not produce the expected combined benefits of the two treatments.

The examples above show that infiltration and crosslinking of resins alone within wood does not provide the sort of benefits that are sought, particularly for plantation grown softwood species.

In an alternative approach a polymerising resin is combined with low molecular weight hydrophilic materials compatible with wood cell polymers.

NZ patent 235036 and U.S. Pat. No. 5,770,319 teach that treatment of radiata pine with a prepolymer formed from hexamethoxymethyl melamine and maltodextrins, followed by heating to form a polymer within the wood cell wall, results in an increase in modulus of elasticity (MoE) of about 12% at weight gains of approximately 40-60%, as well as increased hardness and biological resistance. Disadvantages of using the process disclosed include the production of excessively heavy wood and insufficient stiffening (12%) for many structural applications.

Franich et al. (2005. Proceedings 13th ISWFPC, pp. 73-79) disclose an improved composition formed from hexamethoxymethyl melamine and chitosan oligosaccharides that produces an increase in MoE of up to 20%. Disadvantages of the process disclosed include the prohibitive cost of the starting material, chitosan (currently around US$15/kg), and the need to depolymerise chitosan prior to polymerisation.

Franich et al. (op. cit.) teach that oligosaccharides used to form prepolymers must be small enough (<1,000 Da) to penetrate lignocellulosic cell walls.

SUMMARY OF THE INVENTION

An object of the present invention is to provide an improved method for modification of wood products, or at least to provide the public with a useful choice.

In this specification, the term "wood products" includes wood, engineered wood products, reconstituted wood products, wood plastic composites and any other product having wood as a component thereof.

The inventive composition and method may provide one or more of improved stiffness, strength, surface hardness, dimensional, stability, water resistance, flame retardancy, and biological resistance in a wood product.

Surprisingly, we have found that polyfunctional hydrophilic polymers of high molecular weight reacted with a crosslinking agent produce significant improvements in wood stiffening properties at lower weight gains than previous methods.

In this specification, the term "high molecular weight" means molecular weights in excess of 1,000 Da.

Contrary to the teachings of Lukowski (op. cit.), we disclose that the degree of wood stiffening may be increased by increasing the time of the crosslinking reaction and hence the molecular weight of the resultant prepolymers in the treatment formulation.

Most effective are polyfunctional hydrophilic polymers crosslinked to the point where the shelf life at ambient temperature is too short to be commercially useful. The shelf life of prepolymers formed in this manner may be extended to a practical value by mixing with a second prepolymer formed from a sugar and a crosslinking agent.

In a first aspect the invention provides a composition for the modification of a wood product, the composition containing: A) a prepolymer formed by the reaction of a polyfunctional hydrophilic polymer of high molecular weight and a crosslinking agent.

Preferably the polyfunctional hydrophilic polymer has a molecular weight greater than 1,000 Da, more preferably greater than 3,000 Da, still more preferably greater than 10,000 Da.

Preferably the polyfunctional hydrophilic polymer has a molecular weight greater in the range 1,000 to about 250,000 Da, more preferably in the range from 1,000 to about 100,000 Da.

Preferably the composition modifies a wood product through one or more of: improved stiffness, strength, surface hardness, dimensional stability, water resistance, flame retardancy, and biological resistance.

Preferably the composition contains at least one solvent. Preferably the solvent is miscible with water.

Preferably the composition contains at least one surfactant.

Preferably the composition contains at least one preservative.

Preferably the composition contains at least one dye.

Preferably the polyfunctional hydrophilic polymer in Part A is a vinyl polymer.

Preferably the vinyl polymer is polyvinyl alcohol, polyvinyl acetate, polyvinyl pyrrolidone, polyacrylic acid, polyacrylamide, or mixtures, derivatives or salts thereof, or a copolymer of polyvinyl alcohol, polyvinyl acetate, polyvinyl pyrrolidone, polyacrylic acid, polyacrylamide and derivatives thereof.

Preferably the vinyl polymer is polyvinyl alcohol. Preferably the polyvinyl alcohol has a degree of hydrolysis in the range from about 50% to about 100%. Preferably the polyvinyl alcohol has a degree of hydrolysis from about 80% to about 100%.

Alternatively the polyfunctional hydrophilic polymer in Part A is a polyamide. Preferably the polyamide is a synthetic polyamide, a synthetic polyamino acid, a polypeptide or a derivative thereof.

Alternatively the polyfunctional hydrophilic polymer in Part A is a polysaccharide.

Alternatively the polyfunctional hydrophilic polymer in Part A is a cellulose derivative including cellulose ethers and cellulose esters.

Alternatively the polyfunctional hydrophilic polymer in Part A is a lignin derivative, a lignosulfonic acid or a salt thereof.

Alternatively the polyfunctional hydrophilic polymer in Part A is a polyol, preferably a polyether polyol, preferably polyethylene glycol or polypropylene glycol.

Alternatively the polyfunctional hydrophilic polymer in Part A is a polylactic acid or a polycaprolactone.

Preferably the composition also contains: B) a prepolymer formed by the reaction of a sugar and a crosslinking agent.

Preferably the sugar is a monosaccharide or disaccharide.

Preferably the sugar is sucrose, maltose, lactose, trehalose, cellobiose, chitobiose, glucose, fructose, galactose, mannose, or a chemical derivative thereof. Preferably the sugar is sucrose.

Preferably the crosslinking agent in each of Part A and Part B is an amino resin. Preferably the amino resin is a hydroxymethyl or alkoxymethyl derivative of melamine, benzoguanamine, urea, glycoluril, dihydroxyethylene urea, acrylamide or methacrylamide.

Alternatively the crosslinking agent in each of Part A and Part B is a compound containing two or more functional groups selected from hydroxymethyl, alkoxymethyl, epoxide, vinyl, aldehyde, alcohol, carboxylic acid, ester, anhydride or acyl halide groups.

Preferably the ratio of polyfunctional hydrophilic polymer to crosslinking agent is in the range of substantially 0.5:1 to 10:1.

Preferably the ratio of sugar to crosslinking agent is in the range of substantially 0.5:1 to 10:1.

Preferably the solvent is an alcohol, a glycol, an ether alcohol, ester, amine, alkanolamine or amine oxide.

Preferably the solvent is present at substantially 0-60% by weight, up to a concentration that will not adversely affect the solubility of other components of the composition.

Preferably the ratio of prepolymer A to prepolymer B is in the range of substantially 0.1:1 to 10:1.

Preferably the prepolymer of part A is formed by reaction of the polyfunctional hydrophilic polymer and crosslinking agent, in the presence of a catalyst for promoting crosslinking.

Preferably the catalyst is an acid.

Preferably the crosslinking reaction is terminated by addition of a polymerisation inhibitor. Preferably the polymerisation inhibitor is a base.

Preferably the prepolymer of part B is formed by reaction of the sugar and crosslinking agent, in the presence of a catalyst for promoting crosslinking.

Preferably the catalyst is an acid.

Preferably the crosslinking reaction is terminated by addition of a polymerisation inhibitor.

Preferably the polymerisation inhibitor is a base.

Preferably the prepolymers of A and B are formed in separate reactions and then combined.

Alternatively the prepolymers of A and B may be formed concurrently or sequentially in the same reaction medium.

This aspect also extends to a method of modification of a wood product, the method including applying to the wood product an effective amount of a composition as described above.

Preferably the wood product is wood, an engineered wood product, a reconstituted wood product or a wood plastic composite, including: solid wood, timber or lumber, veneers of various thicknesses, wood flakes, chips, strands, fibres, flour, or nanofibrils, glued laminated timber, plywood, laminated veneer lumber, strand board, oriented strand board, flake board, particle board, medium density fibreboard, high density fibreboard, hard board, and combination products such as structural I-beams.

Preferably the composition is applied to the wood product within a sealed pressure vessel by evacuation and/or pressure, or by dipping, hot or cold soaking, sap displacement, or by surface application methods such as spraying, painting, pouring, rolling, or curtain coating.

Alternatively the wood product is a reconstituted wood product or wood plastic composite and the composition is applied to the wood components of the wood product by injection into a blow line, or by intimate mixing with the flakes, chips, strands, fibres, flour, or nanofibrils, or by admixture with glues, resins or waxes as used in the manufacturing system.

Preferably the treated material is dried at a temperature less than the curing temperature of the prepolymers, following application of the composition.

Preferably the treated material is cured following application of the composition by heating to substantially 50° C. to 200° C., with or without pressure.

Preferably the curing step is performed by heating the impregnated material in a forced air oven or a drying kiln, by hot pressing, or by a combination of cold pressing and hot pressing, or by cold pressing followed by heating in an oven or drying kiln.

Preferably the composition is a shelf stable composition.

Preferably the composition has a high solids content. The term high solids as used herein is defined as meaning a composition having a solids content greater than 10%.

Preferably the polyfunctional hydrophilic polymer in A above is selected from polysaccharides, water soluble cellulose ethers and esters, lignosulfonic acids and other water soluble lignin derivatives, polypeptides, water soluble polyacrylic acids, polylactides, polycaprolactones, polyamides, polyacrylamides, polyvinylpyrollidones, polyvinyl acetates, polyvinyl alcohols (PVA), and polyols, as well as mixtures, water soluble derivatives, salts and copolymers thereof.

Alternatively the hydrophilic polymer in A above may be selected from polysaccharides, cellulose ethers and esters, lignosulfonic acids and other lignin derivatives, polypeptides, polyacrylic acids, polylactides, polycaprolactones, polyamides, polyacrylamides, polyvinylpyrollidones, polyvinyl acetates, polyvinyl alcohols, and polyols, as well as mixtures, derivatives and copolymers thereof, that are soluble in a non-aqueous solvent or a mixture of water and a non-aqueous solvent, provided that the products of the crosslinking reaction are soluble, miscible or dispersible in water.

The sugar in B above can be a monosaccharide or disaccharide, including glucose, fructose, sucrose, trehalose, maltose and lactose, or a derivative thereof.

The crosslinking agent in A and B above is selected from amino resins based on melamine, urea, glycoluril, benzoguanamine and acrylamide etc, phenolic resins, or compounds containing two or more functional groups selected from hydroxymethyl, alkoxymethyl, epoxide, vinyl, aldehyde, alcohol, carboxylic acid, ester, anhydride or acyl halide groups.

Preferably crosslinking reaction A or B is initiated by the addition of a water soluble acid catalyst and is terminated by the addition of a polymerisation inhibitor. Optionally the polymerisation inhibitor may be a base.

In reaction A the ratio of polyfunctional hydrophilic polymer to crosslinking agent can be in the range of substantially 0.5:1 to 10:1. The crosslinking reaction temperature is in the range 15° C. to 60° C. The polyfunctional hydrophilic polymer is reacted with the crosslinking agent to form a prepolymer that preferably will solidify in less than 20 days when stored at ambient temperature after termination of the crosslinking reaction.

In reaction B the ratio of sugar to crosslinking agent can be the range of substantially 0.5:1 to 10:1. The reaction temperature can be in the range 15° C. to 100° C. The sugar is reacted with the crosslinking agent to form a prepolymer that will solidify in less than 6 months when stored at ambient temperature after termination of the crosslinking reaction.

Preferably the solvent is miscible with water.

Preferably the solvent is an alcohol, a glycol, an ether alcohol, ester, amine, alkanolamine or amine oxide.

Preferably the solvent is present at substantially 0-60% by weight, up to a concentration that will not adversely affect the solubility of other components of the composition.

In the preferred form the composition having a shelf life in excess of one month when stored at ambient temperature is produced by mixing A and B above.

The ratio of A to B may be in the range of substantially 0.1:1 to 10:1.

In one preferred form the composition is applied to wood, engineered wood products, reconstituted wood products and wood plastic composites within a sealed pressure vessel by evacuation and/or pressure, or by dipping, hot or cold soaking, or sap displacement, or by surface application methods such as spraying, painting, pouring, rolling, or curtain coating.

According to another preferred form the composition is applied to the components of wood, engineered wood products, reconstituted wood products and wood plastic composites by injection into the blow line, or by intimate mixing with the fibre, flake, strand or chip, or by admixture with glues, resins or waxes as used in the manufacturing system.

Preferably at the time of application, the treated material is in a wet state, or is in a dried state. Following application the treated material is optionally dried at a temperature less than the curing temperature of the prepolymers.

Preferably following application the treated material is cured by heating to substantially 50° C. to 200° C., with or without pressure. The curing reaction can be performed by heating the impregnated material in a forced air oven or a drying kiln, by hot pressing, or by a combination of cold pressing and hot pressing, or by cold pressing followed by heating in an oven or drying kiln.

The invention also provides modified wood, engineered wood products, reconstituted wood products and wood plastic composites produced by the method as broadly stated above.

The wood, engineered wood products, reconstituted wood products and wood plastic composites can include solid wood, timber or lumber, veneers of various thicknesses, wood flakes, strands, fibres, flour, or nanofibrils, glued laminated timber, plywood, laminated veneer lumber, strand board, oriented strand board, flake board, particle board, medium density fibreboard, high density fibreboard, hard board, and combination products such as structural I-beams.

In a further embodiment of the invention there is provided a method for modification of wood, engineered wood products, reconstituted wood products and wood plastic composites consisting of:

application thereto of an effective amount of a composition containing a mixture of a prepolymer formed from a polyfunctional hydrophilic polymer and a crosslinking agent combined with a prepolymer formed from a sugar and a crosslinking agent, and optionally one or more of a solvent, a surfactant, a wood preservative or a dye.

an optional drying step; and a curing step brought about by catalysis and/or application of heat and optionally pressure.

The term prepolymer, as used herein, refers to the reaction products resulting when a polymer is reacted with a crosslinking agent or a sugar is reacted with a crosslinking agent, as described in detail below.

According to the present invention wood can, for example, include solid timber or lumber as used for building components including exterior wall boards, timber framing, plates, trusses, outdoor construction materials, outdoor furniture, decking, timber framing, poles, railway sleepers, fencing materials, and other examples known to those versed in the art; and other wood based products.

Engineered wood products can, for example, include glued solid timber or glued wood veneers, strands or fibres, including such products as glued laminated timber, laminated veneer lumber (LVL), plywood.

Reconstituted wood products can, for example, include strand board, oriented strand board, flake board, particle board, medium density fibreboard, high density fibreboard, and combination products.

Further, it should be noted that the scope of this invention extends to the modification of precursor components of engineered or reconstituted wood products and wood plastic composites including solid timber or lumber, veneers, strands, fibres, nanofibrils, flour, etc at any stage during the manufacture of such products.

Wood-plastic composites can, for example, include composites containing sawdust, flakes, strands, fibres, nanofibrils or flour derived from wood or other lignocellulosic materials, combined with plastics such as polypropylene, polyethylene, polyvinyl chloride, or other examples known to those versed in the art.

Similar methods could be applied to modification of non-wood sourced lignocellulosic materials, for example from fibre crops such as cotton, hemp, sisal, jute, flax, *Phormium*, ramie, and bamboo, as well as glued products and composites based as these materials.

The modification of wood products using this invention results in one or more of improved stiffness, strength, surface hardness, dimensional stability, water resistance, flame retardancy, and biological resistance.

In a second aspect the invention provides a wood product modified by application of a prepolymer formed by the reaction of a polyfunctional hydrophilic polymer of high molecular weight and a crosslinking agent.

Preferably the wood product is modified by application of a composition including the prepolymer and also including B) a prepolymer formed by the reaction of a sugar and a crosslinking agent.

DESCRIPTION OF THE DRAWINGS

The invention will now be described by way of example only with reference to the accompanying drawings, in which.

DETAILED DESCRIPTION OF THE INVENTION

Figure 1:
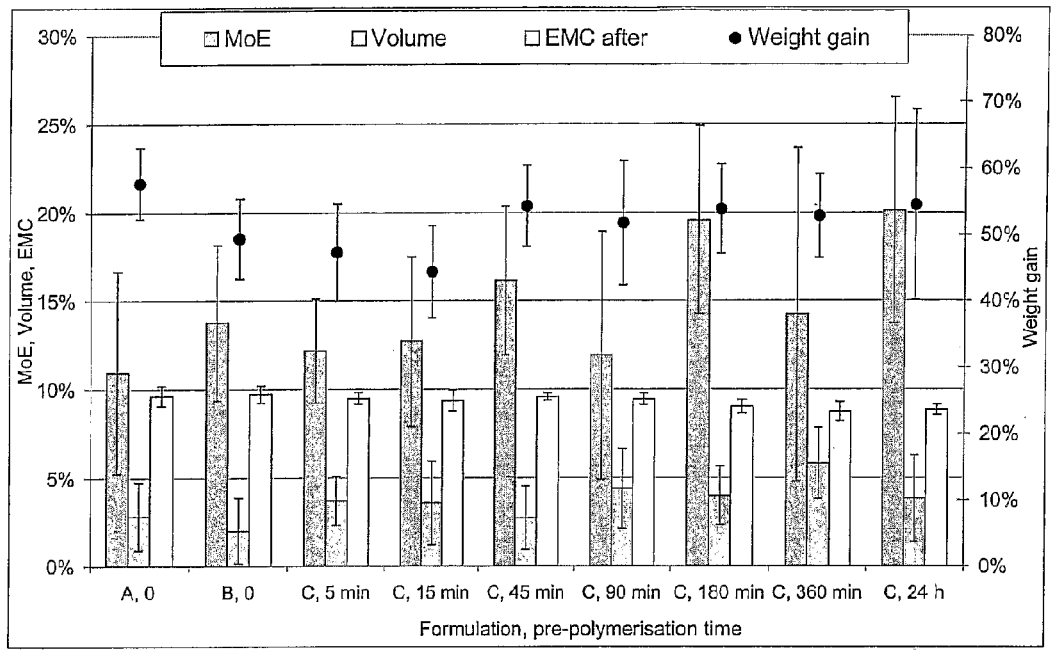
FIG. 1 shows the percentage change in modulus of elasticity (MoE) and volume, the final equilibrium moisture content (EMC) and the weight gain of treated veneers in relation to the time of prepolymerisation of Suc-HMMM treatment formulations. The bars and circles represent the mean of six replicates and error bars represent standard deviations from the mean.

In some embodiments the composition may include only a single part. However, according to a preferred embodiment the composition of this invention consists of two parts:

A. a prepolymer formed by the reaction of a polyfunctional hydrophilic polymer of molecular weight greater than 1,000 Da and a crosslinking agent; and B. a prepolymer formed by the reaction of a sugar and a crosslinking agent.

The polyfunctional hydrophilic polymers in Part A may have molecular weights greater than 1,000 Da, preferably higher than 3,000 Da, more preferably higher than 10,000 Da. The polyfunctional hydrophilic polymers in Part A may have molecular weights in the range 1,000 to 250,000 Da, preferably 1,000 to 100,000 Da.

Examples of suitable polyfunctional hydrophilic polymers in Part A are water soluble polysaccharides, cellulose derivatives such as cellulose ethers and esters, lignosulfonic acids and other lignin derivatives, polypeptides, as well as synthetic polymers such as polyacrylic acids, polylactides, polyactic acids, polycaprolactones, polyamides, polyacrylamides, polyvinylpyrollidones, polyvinyl acetates, polyvinyl alcohols, and polyols.

Alternative examples of suitable hydrophilic polymers are polysaccharides, cellulose derivatives such as cellulose ethers and esters, lignosulfonic acids and other lignin derivatives, polypeptides, polyacrylic acids, polylactides, polylactic acids, polycaprolactones, polyamides, polyacrylamides, polyvinylpyrollidones, polyvinyl acetates, polyvinyl alcohols, and polyols that are soluble in a non-aqueous solvent or a mixture of water and a non-aqueous solvent, provided that the products of the crosslinking reaction are soluble, miscible or dispersible in water.

Suitable polyamides include synthetic polyamides, synthetic polyamino acids, polypeptides and derivatives thereof.

Suitable polyols include polyether polyol, preferably polyethylene glycol or polypropylene glycol.

Further examples of suitable polyfunctional hydrophilic polymers in Part A are mixtures of the abovementioned polymers.

Where polyvinyl alcohol is used, the polyvinyl alcohol preferably has a degree of hydrolysis in the range from about 50% to 100%, more preferably in the range 80% to 100%.

Further examples of suitable polyfunctional hydrophilic polymers in Part A are chemical derivatives, salts and partial salts of the above-mentioned polymers.

Further examples of suitable polyfunctional hydrophilic polymers in Part A are copolymers of the abovementioned synthetic polymers.

The sugar in Part B is preferably a monosaccharide or disaccharide. Examples are naturally occurring sugars including glucose, fructose, sucrose, trehalose, maltose and lactose. In addition the monosaccharide or disaccharide component may be prepared by chemical or enzymatic depolymerisation of naturally occurring polysaccharides such as pectin, gums, glucans, glucomannans, chitin, chitosan, cellulose, starch, agar, alginates, carrageenans, microbial and fungal polysaccharides. The sugar may be cellobiose, chitobiose, galactose or mannose.

Additional functionality may be achieved by utilising or including derivatives of monosaccharides or disaccharides such as sugar alcohols, alkyl glycosides and acylated derivatives (water repellency), terpene glycosides and aryl glycosides (antimicrobial), etc.

Preferably the monosaccharide or disaccharide in Part B is selected from naturally occurring sugars including glucose, fructose, sucrose, trehalose, maltose and lactose, preferably sucrose.

Suitable crosslinking agents for Part A and Part B of the composition of the present invention include amino resins based on melamine, urea, glycoluril, benzoguanamine, acrylamide etc, as is known in the art, phenolic resins based on phenol and substituted phenols, or compounds containing two or more functional groups selected from hydroxymethyl, alkoxymethyl, epoxide, vinyl, aldehyde, alcohol, carboxylic acid, ester, anhydride or acyl halide groups. The choice of crosslinker is made taking into account the reactivity, functionality and molecular weight of the polyfunctional hydrophilic polymer in use, and the requirement for the final product to be water soluble, water dispersible, or able to form a water-based emulsion, as is known in the art.

The amino resin may be a hydroxymethyl or alkoxymethyl derivative of melamine, benzoguanamine, urea, glycoluril, dihydroxyethylene urea, acrylamide or methacrylamide.

The polyfunctional hydrophilic polymer and the crosslinking agent may be provided in quantities with a ratio in the range of about 0.5:1 to 10:1 by weight. The sugar and the crosslinking agent may be provided in quantities with a ratio in the range of about 0.5:1 to 10:1 by weight.

Included in Part A and Part B according to this invention is an optional water soluble acid catalyst. Preferably the catalyst is added during manufacture of Part A and Part B to bring about crosslinking of the polyfunctional hydrophilic polymer and crosslinking of the sugar. In certain cases the two reactants may be present in an emulsion in which case catalysis at the aqueous-organic interface is desirable.

Strong acids, in particular the aromatic sulfonic acids are preferred, while not restricted to these acids, with p-toluene sulfonic acid the most preferred example. The amount of acid required ranges from substantially 0.1-1.0% by weight, sufficient to render the system acidic and complete the crosslinking reaction within twenty four hours at temperatures in the range 10 to 60° C.

The crosslinking reaction may be terminated by adding a polymerisation inhibitor. Optionally the polymerisation inhibitor may be a base to raise the pH. As is understood in the art, the shelf life may be increased by increasing the pH up to a value below that at which alkaline catalysis may occur.

Optionally the catalyst may be added to the composition immediately prior to treatment of the wood or wood product or as part of a secondary treatment process. Furthermore it should be noted that a catalyst may not be required at all, the crosslinking occurring exclusively during heat treatment and/or as a consequence of the intrinsic acidity of the treated wood or wood product.

The solvent component(s) of the composition according to the present invention may be chosen in order to fulfil one or more of several possible functions:
- an agent to enhance the uniform distribution and penetration of the formulation into the treated materials;
- an initial solvent for the crosslinking agent;
- a monomer capable of crosslinking the polyfunctional hydrophilic polymer of Part A, or the sugar of Part B, with or without the aforementioned crosslinking agent.

Solvents may be selected from any low molecular weight, water miscible solvent capable of hydrogen bonding, thus having a primary function of promoting swelling and permeation of lignocellulosic cell walls. Thus solvents include, but are not restricted to, certain alcohols, amines, alkanolamines and amine oxides.

Preferred alcohols include water miscible primary, secondary or tertiary alkyl alcohols, phenols, polyhydroxy alcohols, sugar alcohols, as well as alcohols containing double or triple carbon-carbon bonds or other reactive groups. Alcohols, including low molecular weight aliphatic alcohols such as methanol, ethanol etc, and low molecular weight diols such as ethylene glycol and propylene glycol, are well known to assist uptake and penetration of other components into wood.

Among the alcohols listed above are alcohols with reactive groups thus capable of contributing to the crosslinking process as well as enhancing penetration. Preferred among such alcohols are diols, vinyl alcohol, allyl alcohol, furfuryl alcohol, etc. It will be apparent to those skilled in the art that the degree of reaction of these alcohols is dependent on the time of addition during manufacture of the formulation, i.e. before or after the crosslinking reaction, the choice of catalyst and other parameters.

Amines are known to enhance the penetration of preservatives into wood as well as having intrinsic preservative activity. Preferred amines are primary, secondary and tertiary amines, quaternary ammonium compounds and alkanolamines containing predominantly low molecular weight moieties. It should also be noted that in the case of tertiary amines or quaternary ammonium compounds a long chain aliphatic moiety may confer enhanced water repellency; however, the proportion of such compounds in the composition according to the present invention may counterbalance the beneficial effects of the solvent on penetration and must be adjusted accordingly.

The solvent may also be a glycol, ether alcohol, ester or amine oxide.

The concentration of the solvent component(s) of the composition according to the present invention may range from 0.1%-60% by weight, up to a concentration that will not adversely affect the solubility of other components of the composition, in particular the polyfunctional hydrophilic polymer in Part A or the sugar in Part B.

The surfactant component of the composition according to the present invention is provided to reduce the surface tension of the composition and further improve penetration into the treated materials. A particular requirement is the curtailment of surfactant activity before completion of the modification process to prevent wicking and maximise water repellency. This can be achieved by using surfactants with a short shelf life, heat- or acid-labile surfactants, or surfactants containing highly reactive groups that will decompose, crosslink or polymerise during the curing reaction. Examples of such surfactants are well known in the art.

Suitable preservatives and dyes may also be added to the composition.

The prepolymers of Part A and Part B may be formed separately and then mixed. Alternatively, the prepolymers of Part A and Part B may be formed concurrently or sequentially in the same reaction medium.

The present invention also provides a method for modification of wood and wood products that when applied, in particular, to softwood solid timber or engineered wood products or the precursor components of these products derived from or containing softwood components, will confer enhanced physical properties and biological resistance.

Furthermore this invention provides a method for modification of wood and wood products that can be applied within the constraints of existing manufacturing processes and still give rise to substantial changes in the properties of the resulting modified products.

According to the method provided by this invention the composition may be applied to the treated material by dipping, pouring, curtain coating, spraying, painting, rolling, vacuum impregnation, pressure impregnation, hot or cold soaking, sap displacement as will be known to those versed in the art. It should be noted that the degree of uptake will depend to some extent on the duration and temperature of the application process. This is an important consideration when this invention is to be applied within the context of or during an existing production process for dimensional wood or a manufacturing process for an engineered or reconstituted wood product or wood plastic composite.

Thus, for example where only a limited exposure time is permissible the uptake may be improved under conditions of elevated temperature. In such cases it may be necessary to adjust the composition to prevent premature polymerisation, loss of volatile components etc.

In the case of products such as reconstituted wood products or wood plastic composites including particle board, MDF, hard board, OSB, flake board, strand board etc, the composition may be introduced by injection into a blow line or by intimate mixing with the fibre, flake, strand, chip, flour or nanofibrils. Application may be either as a liquid or powder, either alone or in admixture with glues, resins, and waxes as used in the manufacturing system.

The composition may be applied to the treated material within a sealed pressure vessel by evacuation and/or pressure. Various treatment regimes such as half cell, full cell and others well known in the art may be particularly applicable.

The material treated may be in a wet or dried state before application of the composition. The material treated may be rough sawn, planed, sanded or otherwise reduced to final dimensions, or it may be peeled or sliced into veneers, flaked, milled, refined or otherwise reduced to produce flakes, strands, fibres, nanofibrils or flour before application of the composition. Furthermore, the composition may be applied to the material treated at any stage during the manufacture of an engineered wood product or reconstituted board product. Moreover, the composition may be applied at any time after its manufacture as such is completed.

In most cases excess unabsorbed liquid should be removed from the surface of the treated material by draining, scraping, blowing etc. to avoid the formation of a polymerised coating. For most applications a superficial polymer is undesirable because of potential unevenness resulting from differential uptake, and because the composition is tailored for optimal crosslinking within the treated material rather than formation of a tough exterior coating.

It should be noted that in certain cases the composition may function as a partial or complete substitute for a resin or glue used to manufacture an engineered or reconstituted wood product or wood plastic composite. Alternatively it may be necessary or beneficial to reduce the glue loading to accommodate the additional moisture content of the composition in order to avoid such phenomena as blow during hot pressing etc.

An optional drying step prior to heat curing may be required to reduce the moisture content in certain manufacturing processes, for example to prevent blow during hot pressing of plywood or LVL. Intermediate drying conditions should not lead to premature polymerisation. In particular, intermediate drying steps should be carried out at temperatures less than the curing temperature.

The curing step of the method of this invention is preferably achieved by heating the treated material to 50° C. to 200° C. for sufficient time to complete polymerisation of the impregnated materials and crosslinking to the surrounding lignocellulosic matrix and glues. In the context of an engineered or reconstituted wood product the curing reaction is ideally completed by the normal curing or hot pressing step in the manufacturing process. In the case of wood plastic composites the curing reaction is completed prior to mixing with the plastic component and moulding.

The curing step may or may not be carried out under pressure. The curing step may be a heating process, hot pressing, a combination of hot and cold pressing or cold pressing followed by heating. The heating may be carried out in a forced air oven or drying kiln.

EXAMPLES

In order to further illustrate the invention, the following examples are provided.

Example 1

Formulations A-C, each containing sucrose and hexamethoxymethyl melamine (HMMM) in a 2:1 ratio, combined with other ingredients, are given in Table 1. Sucrose and boric acid were dissolved in water. HMMM was mixed with ethanol then added, with stirring, to the aqueous phase. p-Toluene sulfonic acid (p-TSA) was omitted from Formulation A and a small amount of ammonium hydroxide was added to raise the pH >7.0. Surfynol 104A, containing a 50:50 mixture of Surfynol 104, an acetylenic dial surfactant, and 2-ethylhexanol, was added to complete the formulation. Ammonium hydroxide was added to Formulation B before p-TSA in order to prevent acid catalysis. Surfynol 104A was added to complete the formulation. To prepare Formulation C, sucrose and boric acid were dissolved in water then mixed with HMMM and ethanol in the stated proportions (Table 1), and pre-warmed to 25° C. p-TSA was then added to initiate prepolymerisation and the reaction mixture was maintained at 25° C. Aliquots of the mixture were removed at 5 min, 15 min, 45 min, 90 min, 180 min, 360 min and 24 hours after the addition of pTSA and combined immediately with sufficient ammonium hydroxide to raise the pH >7.0 and terminate the prepolymerisation reaction. Finally Surfynol 104A was added to each neutralised aliquot to complete the formulation.

TABLE 1

Composition of sucrose hexamethoxymethyl melamine formulations.

| | Formulation name | | |
|---|---|---|---|
| | A | B | C |
| | Prepolymerisation time | | |
| Component | Nil | Nil | 5 min-24 h |
| | Concentration (g/kg) | | |
| Sucrose | 333 | 333 | 333 |
| Water | 326 | 317 | 317 |
| HMMM | 167 | 167 | 167 |
| Ethanol | 167 | 167 | 167 |
| Boric acid | 4 | 4 | 4 |
| Toluene-p-sulfonic acid | 0 | 4 | 4 |
| Ammonium hydroxide (33% v/v) | 1 | 6 | 6 |
| Surfynol 104A | 2 | 2 | 2 |

Suc-HMMM formulations prepolymerised for 24 hours have a 4-5 month shelf life when stored at ambient temperature.

*Pinus radiata* veneers were treated with the formulations described in Table 1. Peeled veneers (4.3 mm thick) were sawn along the grain to 14.5 cm in length and 10 mm in width, and randomly divided into groups of six pieces. The initial weight and modulus of elasticity (MoE) of each piece was measured after conditioning for 5 days at 20° C. and 65% RH. Each group was then treated with a different formulation (Table 1) by vacuum impregnation (10 min vacuum (−95 kilopascals gauge), admit solution under vacuum, 20 min atmospheric pressure, drain solution). After partial drying for 1 hour in a fan oven at 30° C., pieces were hot pressed for 12 min at 150° C. to complete sucrose-HMMM polymerisation and crosslinking to the wood. Weight and MoE measurements were performed again after conditioning treated pieces at 20° C. and 65% RH. At the conclusion of the experiment each piece was oven dried at 105° C. for 20 hours, cooled in a desiccator and weighed.

The percentage change in modulus of elasticity resulting from the treatment ($\Delta$ MoE) is defined as:

$$\Delta \text{MoE} = (\text{final MoE minus initial MoE})/\text{initial MoE} \times 100\%$$

The percentage change in volume resulting from the treatment ($\Delta$Volume) is defined as the volume of the conditioned, treated piece divided by the volume of the conditioned, untreated piece minus 100%.

The percentage weight gain resulting from the treatment is defined as the conditioned weight of the treated piece divided by the conditioned weight of the untreated piece minus 100%.

The equilibrium moisture content (EMC) of the treated pieces is defined as:

$$\text{EMC} = (\text{conditioned weight minus oven dry weight})/\text{oven dry weight}$$

As demonstrated in FIG. 1, treatment of veneers with Suc-HMMM formulations produced an increase in MoE. Furthermore, prepolymerisation of the formulation increased the $\Delta$ MoE from approximately 11% to approximately 20%. Increasing prepolymerisation time was accompanied by a decrease in the equilibrium moisture content of treated pieces. In the case of veneers the weight gains, as defined, were approximately 50%. The Suc-HMMM-treated veneers were coated with a crusty deposit.

Example 2

Formulations A1-A6 containing PVA and HMMM in varying ratios, combined with other ingredients, are given in Table 2. An aqueous 20% (w/w) solution of PVA was mixed with HMMM and ethanol, and adjusted to 25° C. p-TSA was added to commence the crosslinking reaction. Ammonium hydroxide solution was added after 1 hour to terminate the reaction and raise the pH >7.0. Surfynol 104A was added after neutralisation.

TABLE 2

Properties of PVA-HMMM formulations of varying composition.

| Component | Formulation | | | | | |
|---|---|---|---|---|---|---|
| | A1 | A2 | A3 | A4 | A5 | A6 |
| | Concentration (g/kg) | | | | | |
| PVA (Poval 203) | 0 | 40 | 80 | 120 | 160 | 200 |
| HMMM | 200 | 160 | 120 | 80 | 40 | 0 |
| Ethanol | 200 | 160 | 120 | 80 | 40 | 0 |
| Water | 592 | 632 | 672 | 712 | 752 | 794 |
| p-TSA | 4 | 4 | 4 | 4 | 4 | 4 |
| NH$_4$OH (25% v/v) | 2 | 2 | 2 | 2 | 2 | 2 |
| Surfynol 104A | 2 | 2 | 2 | 2 | 2 | 0 |
| Properties | | | | | | |
| Initial pH | 7.69 | 7.73 | 7.84 | 7.96 | 7.79 | 7.90 |
| pH at 27 days | 4.41 | 4.29 | 4.12 | 4.41 | 5.43 | 6.40 |
| State at 27 days | Clear liquid | Powdery precipitate | Opaque solid | Opaque solid | Straw liquid | Straw liquid |
| pH at 64 days | 3.90 | 3.88 | 4.09 | 4.39 | 4.64 | 6.22 |
| State at 64 days | Polymer precipitate | Opaque gel | Opaque solid | Opaque solid | Opaque gel | Straw liquid |

Figure 2:
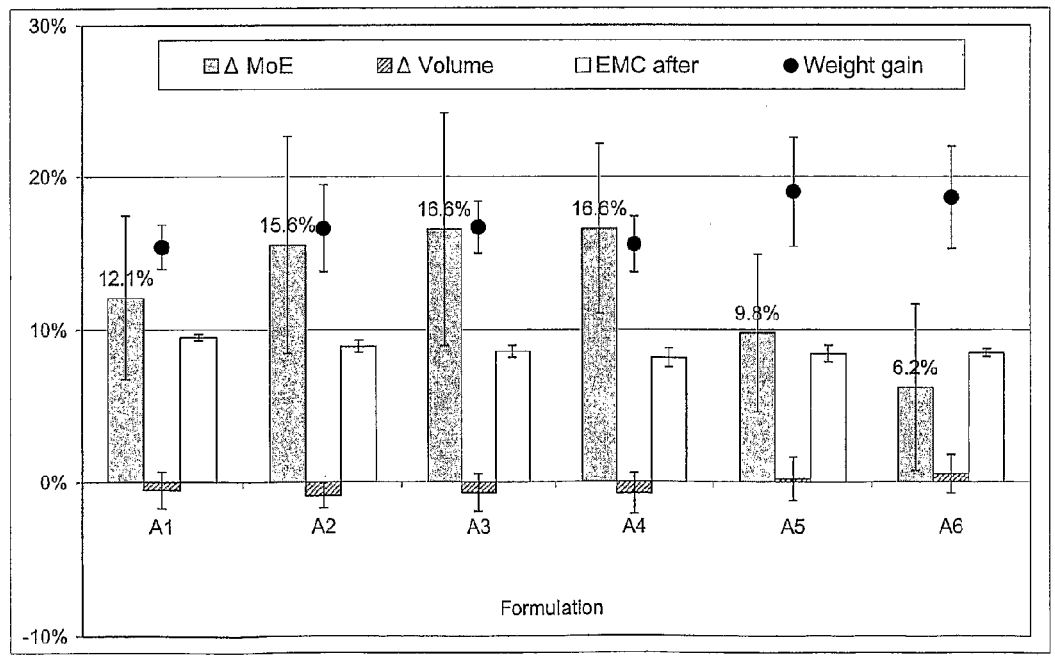
FIG. 2 shows the percentage change in MoE and volume, the final EMC and the weight gain of veneers treated with formulations A1-A6.

Formulation A6 (PVA, no crosslinker) was liquid 64 days post manufacture but formulation A5 was the only prepolymer (crosslinked PVA) in a liquid state at 27 days (Table 1.) *Pinus radiata* veneers were treated with the formulations described in Table 2 and tested as described in Example 1. As demonstrated in FIG. 2, veneers treated with formulations containing both PVA and HMMM crosslinker showed the greatest increase in the MoE.

Example 3

Formulations with a PVA:HMMM ratio of 1.5:1.0 were prepared as described above. The crosslinking reaction was carried out at 25° C. for 15 to 240 minutes. As shown in Table 3 only formulations B1 to B3 from the crosslinking time course were in a liquid state 19 days post manufacture but all had solidified by 56 days.

TABLE 3

Properties of PVA-HMMM formulations prepolymerised for increasing times.

| Component | Formulation | | | | |
|---|---|---|---|---|---|
| | B1 | B2 | B3 | B4 | B5 |
| | PVA-HMMM pre-polymerisation time | | | | |
| | 15 min | 30 min | 60 min | 120 min | 240 min |
| | Concentration (g/kg) | | | | |
| PVA (Poval 203) | 150 | 150 | 150 | 150 | 150 |
| HMMM | 100 | 100 | 100 | 100 | 100 |
| Ethanol | 100 | 100 | 100 | 100 | 100 |
| Water | 642 | 642 | 642 | 642 | 642 |
| p-TSA | 4 | 4 | 4 | 4 | 4 |
| NH$_4$OH (25% v/v) | 2 | 2 | 2 | 2 | 2 |
| Surfynol 104A | 2 | 2 | 2 | 2 | 2 |
| Properties | | | | | |
| Initial pH | 7.47 | 7.65 | 7.34 | 7.42 | 7.38 |
| pH at 19 days | 5.17 | 5.08 | 4.86 | 4.52 | 4.77 |
| State at 19 days | Opaque liquid | Opaque liquid | Opaque liquid | Strong gel | Tough white solid |
| pH at 56 days | 4.43 | 4.42 | 4.40 | 4.36 | 4.48 |
| State at 56 days | Tough white solid | Tough white solid | Tough white solid | Tough white solid | Tough white solid |

Figure 3:
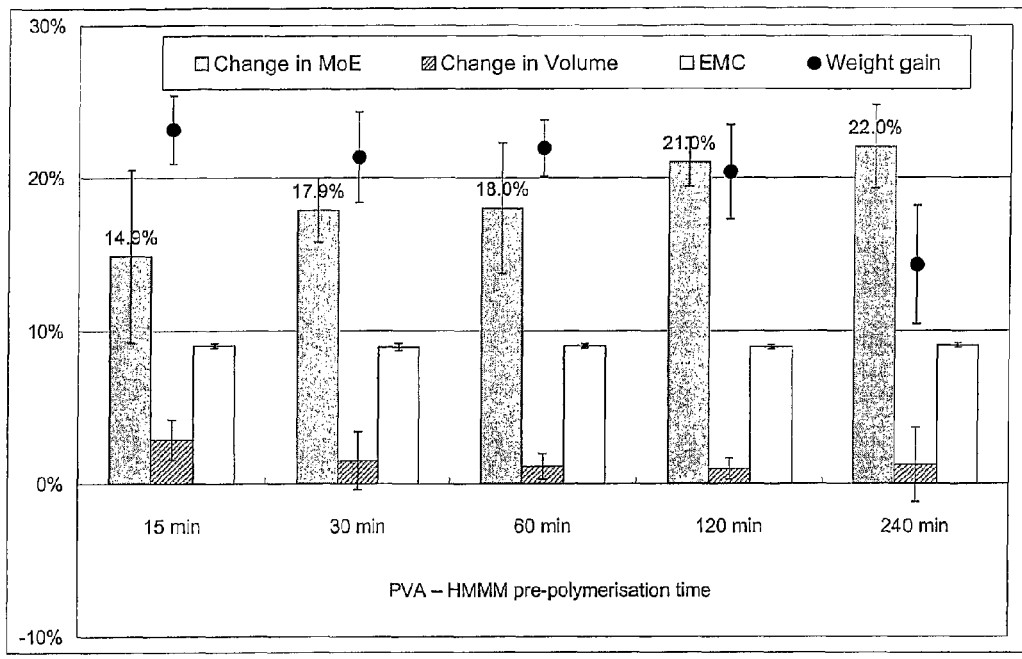
FIG. 3 shows the percentage change in MoE and volume, the final EMC and the weight gain of veneers in relation to the time of prepolymerisation of PVA-HMMM treatment formulations (B1-B5)

*Pinus radiata* veneers were treated with formulations B1-B5 (Table 3) following the method described in Example 1. As shown in FIG. 3 the mean ΔMoE increased from 14.9% to 22% with increasing crosslinking reaction time. This was accompanied by a decrease in percentage weight gain of the treated veneers from 23.2% to 15.6%.

Example 4

A sucrose-HMMM prepolymer (Suc-HMMM) was prepared as described in Example 1 (Table 1, Formulation C, 24 hour prepolymerisation time). Suc-HMMM was mixed 1:1 by weight with each of formulations B1 to B5 from the PVA-HMMM crosslinking time course (Table 3) to form the prepolymer mixtures C1 to C5 as shown in Table 4. The states of the PVA-HMMM Suc-HMMM prepolymer mixtures were assessed after storage at ambient temperature for 17 and 54 days (Table 4). Compared with the data in Table 3 it is evident that a 1:1 dilution of the PVA-HMMM prepolymers with Suc-HMMM has extended that shelf life to the point that only the PVA-HMMM prepolymer reacted for 240 minutes had solidified significantly after storage for 54 days.

TABLE 4

Properties of PVA-HMMM formulations combined with Suc-HMMM prepolymer.

| | Formulation | | | | | |
|---|---|---|---|---|---|---|
| | C1 | C2 | C3 | C4 | C5 | Suc-HMMM |
| | PVA-HMMM pre-polymerisation time | | | | | |
| | 15 min | 30 min | 60 min | 120 min | 240 min | — |
| | Suc-HMMM pre-polymerisation time | | | | | |
| Properties | 24 h | 24 h | 24 h | 24 h | 24 h | 24 h |
| Initial pH | 7.40 | 7.42 | 7.20 | 7.42 | 6.60 | 7.08 |
| pH at 17 days | 5.68 | 5.54 | 5.45 | 5.34 | 5.22 | 5.37* |
| State at 17 days | Opaque liquid | Opaque liquid | Opaque liquid | Opaque liquid | Opaque liquid | Clear liquid* |
| pH at 54 days | 4.66 | 4.66 | 4.62 | 4.57 | 4.56 | 5.37§ |
| State at 54 days | Opaque liquid | Opaque liquid | Opaque liquid | Viscous opaque liquid | Soft opaque gel | Clear liquid§ |

*assessed 35 days post manufacture;
§assessed 72 days post manufacture

Figure 4:
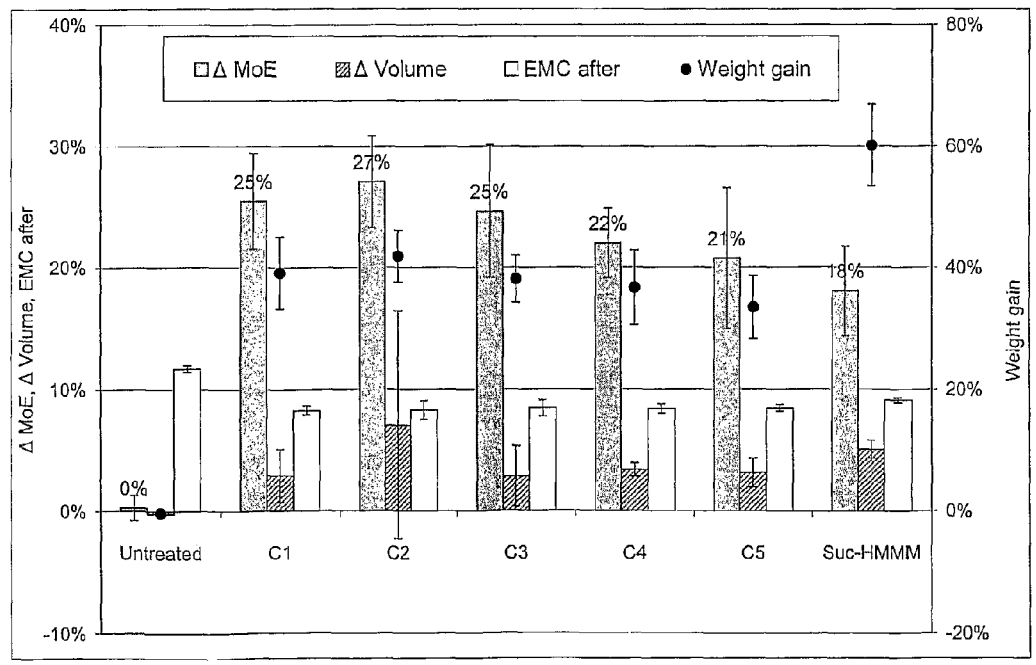
FIG. 4 shows the percentage change in MoE and volume, the final EMC and the weight gain of veneers treated with PVA-HMMM Suc-HMMM prepolymer mixtures.

*Pinus radiata* veneers were treated with formulations C1-C5 and Suc-HMMM (Table 4). As shown in FIG. 4, treatment of veneers with Suc-HMMM produced an average ΔMoE of 18%. When mixed 1:1 by weight with the Suc-HMMM prepolymer, PVA-HMMM prepolymers from the crosslinking time course produced an average ΔMoE that increased from 25% (15 min) to 27% (30 min) and then declined with further increasing reaction times. All of the PVA-HMMM Suc-HMMM prepolymer mixtures produced a greater ΔMoE than Suc-HMMM alone. This enhanced performance was accompanied by a significantly lower weight gain than with Suc-HMMM. Treatment of veneers also reduced the EMC compared to the untreated control (FIG. 3). Veneers treated with PVA-HMMM Suc-HMMM prepolymer mixtures did not show the crusty deposit evident in veneers treated with Suc-HMMM alone.

Example 5

PVA-HMMM prepolymers D1 and D2 were prepared from Poval 203 and Poval 205 (average molecular weights about 13,000 and about 22,000, respectively), D1 in the absence of solvent (Table 5). Suc-HMMM prepolymer D3 was prepared in the presence of 50 g/kg ethanol by initially heating the sucrose/boric acid solution to approximately 55° C. HMMM was mixed with ethanol then added, with stirring, to the aqueous phase. pTSA was added without delay and the mixture maintained at 50° C. for one hour, then allowed to cool to 25° C. and maintained at 25° C. to give a total prepolymerisation time of 24 hours (Table 5). Suc-HMMM prepolymer D4 was prepared in the presence of 167 g/kg Methanol. Two PVA-HMMM Suc-HMMM prepolymer mixtures were prepared by combining equal parts by weight of D1+D3, and D2+D3 (Table 5).

TABLE 5

Composition of prepolymers.

| Component | Formulation | | | |
|---|---|---|---|---|
| | D1 | D2 | D3 | D4 |
| | Concentration (g/kg) | | | |
| PVA (Poval 203) | 150 | | | |
| PVA (Poval 205) | | 150 | | |
| Sucrose | | | 333 | 333 |
| Boric acid | | | 4 | 4 |
| HMMM | 100 | 100 | 167 | 167 |
| Ethanol | | 100 | 50 | |
| Methanol | | | | 167 |
| Water | 742 | 642 | 436 | 315 |
| p-TSA | 4 | 4 | 4 | 4 |
| NH$_4$OH (25% v/v) | 2 | 2 | 4 | 8 |
| Surfynol 104A | 2 | 2 | 2 | 2 |
| Prepolymerisation conditions | 30 min, 25° C. | 30 min, 25° C. | 1 h, 50° C., 23 h, 25° C. | 20 h, 25° C. |

*Pinus radiata* veneers were treated with D1+D3, D2+D3 and D4 to determine the effect on surface hardness. Peeled veneers (4.3 mm thick) were sawn along the grain to 14.5 cm in length and 10 mm in width. Veneer pieces containing at least 1 mm of early wood on one face (early wood face) were randomly divided into groups of six and conditioned for 5 days at 20° C. and 65% RH. Hardness measurements were performed using a 136 degree wedge (Doyle and Walker (1984. Wood and Fiber Science 17, 369-376) aligned across the early wood face. Hardness values (N/mm), normalised based on width at the point of measurement, were calculated from force versus deflection data as the wedge was depressed 0.6 mm into the veneer. Three initial hardness measurements were performed on each piece at positions marked with a pencil line. Veneers were then treated by vacuum impregnation (10 min vacuum, admit solution, 20 min atmospheric pressure, drain solution), partially, dried for 1 hour in a fan oven at 30° C., cured by hot pressing for 12 min at 150° C. then conditioned at 20° C. and 65% RH. Hardness measurements were repeated on each piece at a distance of 5-10 mm along the face from the initial measurements.

The percentage change in hardness resulting from the treatment (Δ Hardness) is defined as:

ΔHardness=(final hardness minus initial hardness)/initial hardness×100%

Figure 5:
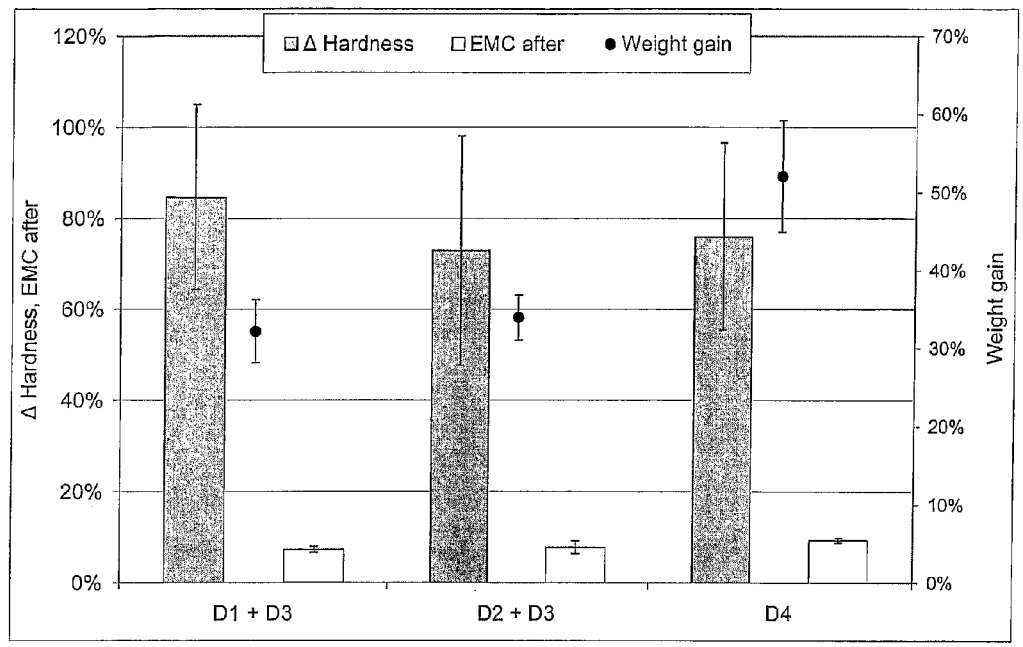
FIG. 5 shows the percentage change in surface hardness, the final equilibrium moisture of veneers treated with PVA-HMMM Suc-HMMM prepolymer mixtures D1+D3 and D2+D3, and Suc-HMMM prepolymer D4.

As shown in FIG. 5, all three treatments increased surface hardness by 70-85%, however, treatment with Suc-HMMM prepolymer D4 produced a greater weight gain than the prepolymer mixtures, and the D4-treated veneers were crusty.

Example 6

Small MDF lab boards were manufactured from *Pinus radiata* fibres treated with a PVA-HMMM Suc-HMMM prepolymer mixture. The prepolymers were made as described in Table 5 (D1+D3) except 0.5 g/kg Silwet 408 was used in place of 2 g/kg Surfynol 104A. Dry wood fibres (65 g) were wetted by vacuum impregnation with 60° C. tap water, drained of excess water then combined with PVA-HMMM Suc-HMMM (0, 10%, 30% and 50% based on dry fibre weight). After thorough mixing the fibres were dried for 24 h at 30° C., then circulated in a forced air blender and combined with a mixture, containing 9.75 g Dynomel 386 (MUF resin, Dynea), 0.65 Mobil CER 739 wax and 3.0 g water, sprayed into the blender with an airbrush. The fibres were hot pressed at 170° C. for 400 seconds to make a 105 mm×105 mm×6 mm MDF boards. Each board was sanded and divided into four 25 mm×25 mm pieces, two of which were soaked in 80° C. water for 5 min and the other two soaked in 20° C. water for 23 hours. Weights and thicknesses (measured in 5 places per piece) were measured before and immediately after soaking.

TABLE 6

Soak testing of MDF made from wood fibres treated with Suc-HMMM PVA-HMMM.

| % Suc-HMMM PVA-HMMM | Average weight gain (%) | Average thickness increase (%) |
|---|---|---|
| 5 minute soak in 80° C. water | | |
| Untreated | 41.16 | 19.27 |
| 10% | 21.26 | 16.01 |
| 30% | 12.80 | 9.38 |
| 50% | 7.38 | 6.72 |
| 23 hour soak in 20° C. water | | |
| Untreated | 16.60 | 10.83 |
| 10% | 16.15 | 10.65 |
| 30% | 16.28 | 9.23 |
| 50% | 11.69 | 7.48 |

As shown in Table 6, MDF made from wood fibres treated with a PVA-HMMM Suc-HMMM prepolymer mixture displayed a reduced tendency to gain water and swell when soaked in hot and cold water.

Example 7

Two *Pinus radiata* veneers (340 mm×350 mm×2.5 mm) were dipped for 60 min in PVA-HMMM Suc-HMMM (see Example 6), drained then partially dried in a 30° C. incubator for 2 hours. The two treated veneers, as well as two untreated veneers, were individually hot pressed at 135° C. for 400 seconds. Four days later four 50 mm×500 mm squares were cut from each veneer. Length (along the grain) width and thickness were each measured at two independent positions marked on each square. The pieces were then soaked in water at 20° C. for 24 hours and the dimensions were measured a second time at the marked positions. The treated veneers gained less water and showed greater dimensional stability than untreated veneers in the soak test (Table 7).

TABLE 7

Weight gain (average) and average increases in length, width and thickness of untreated veneers and veneers treated with PVA-HMMM Suc-HMMM.

| Treatment | Weight gain | Length | Width | Thickness |
|---|---|---|---|---|
| Untreated | 80.6% | 0.32% | 4.48% | 3.75% |
| Treated | 54.1% | 0.47% | 2.96% | 1.47% |

Example 8

A 1:1 PVA-HMMM Suc-HMMM prepolymer mixture was made in which the ethanol component of Suc-HMMM was replaced with CALFAX DBA-70. CALFAX was added to the aqueous phase prior to the addition of HMMM and pTSA. Other manufacturing details are noted in Table 8.

TABLE 8

Composition of prepolymers.

| | Formulation | |
|---|---|---|
| Component | PVA-HMMM Concentration (g/kg) | Suc-HMMM |
| PVA (Poval 203) | 150 | |
| Sucrose | | 333.3 |
| Boric acid | | 4 |
| CALFAX DBA-70 | | 10 |
| HMMM | 100 | 167 |
| Water | 734 | 467 |
| p-TSA | 4 | 4 |
| NH$_4$OH (25% v/v) | 12 | 15 |
| Silwet 408 | 0.5 | 0.5 |
| Prepolymerisation conditions | 60 min, 15° C. | 1 h, 50° C., 23 h, 25° C. |

Figure 6:
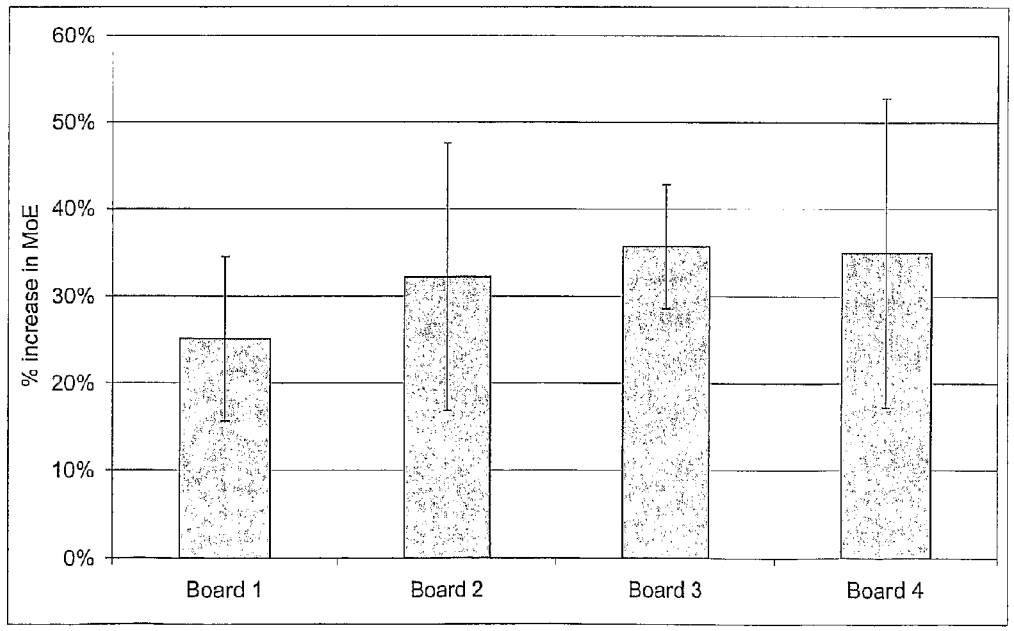
FIG. 6 shows the percentage increase in MoE measured flatwise in LVL manufactured from veneers treated with a PVA-HMMM Suc-HMMM prepolymer mixture.
Figure 7:
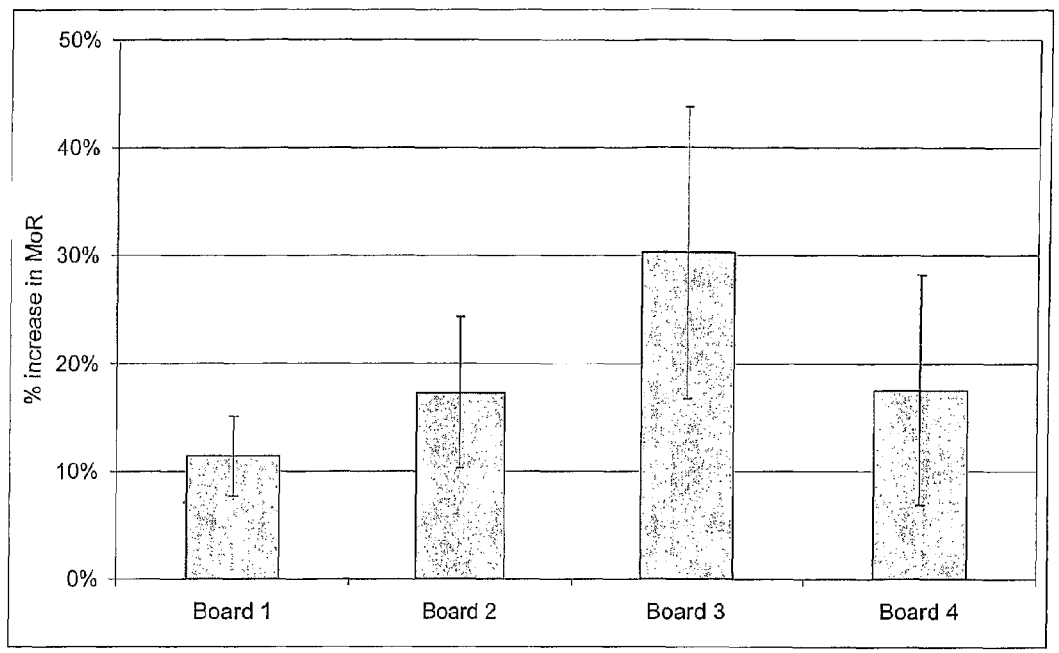
FIG. 7 shows the percentage increase in MoR measured flatwise in LVL manufactured from veneers treated with a PVA-HMMM Suc-HMMM prepolymer mixture.
Figure 8:
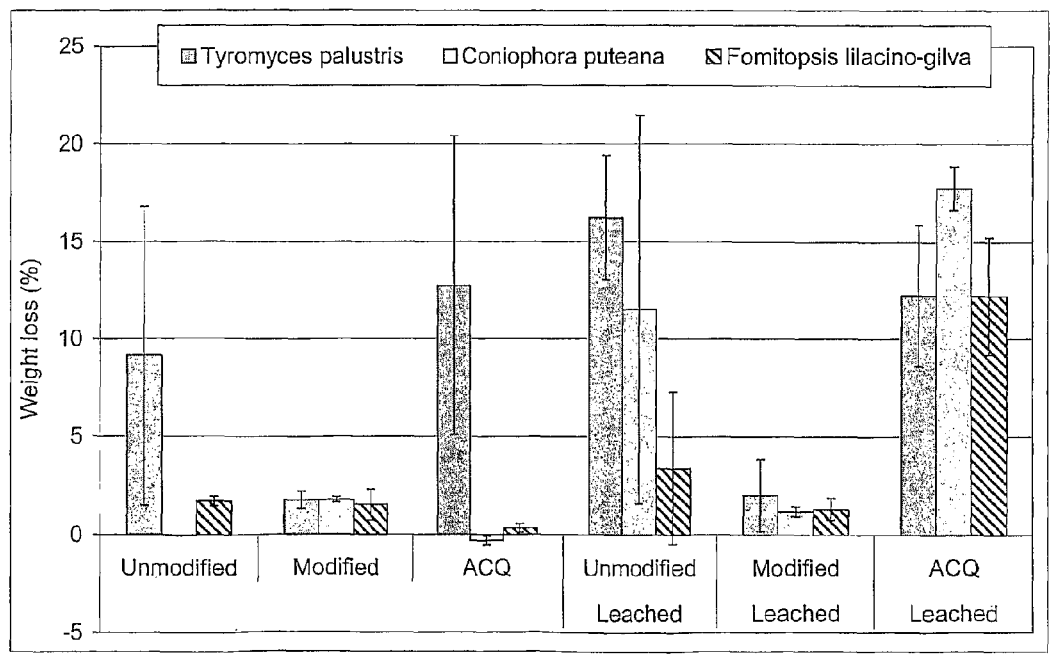
FIG. 8 shows percentage weight loss of modified and unmodified LVL exposed to brown rot decay organisms in a rot jar test.

The PVA-HMMM Suc-HMMM prepolymer mixture was used in the manufacture of LVL from *Pinus radiata* veneers. Veneer squares (350 mm×350 mm×3.2 mm) were selected visually to obtain a consistency of early wood/late wood content, grain, etc across the squares. The squares were then labelled and cut in half along the grain to provide 350 mm×175 mm 3.2 mm matched pairs. Twenty halved squares were treated with the prepolymer mixture by vacuum impregnation (15 min vacuum (−95 kilopascals gauge), admit solution under vacuum, 20 min atmospheric pressure, drain solution), then dried for 18 hours in a fan oven at 30° C. Five "modified" LVL lab boards were made with two treated veneers on the bottom face, eight untreated core veneers and two treated veneers on the top face. Five "unmodified" LVL lab boards were also made entirely of untreated veneers ensuring that the veneer matched pairs were arranged in the correct positions within the boards. Veneers were laid up with PF resin (200 g/m$^2$) and hot pressed (37 mm thickness, 30 min, 160° C.). Four 350 mm×30 mm lengths were cut from each board. The lengths from four modified boards and their unmodified matched pairs were tested directly for MoE and MoR, with the force applied flatwise as in scaffold planking. Prepolymer treatment of superficial veneers resulted in an increased MoE (30% average overall, FIG. 6) and an increased MoR (19% average overall, FIG. 7). The lengths from the fifth modified and unmodified boards were leached according to EN84 before testing in the same manner. In the leached lengths prepolymer treatment produced an average 26% increase in MoE and an average 25% increase in MoR.

Example 9

Modified and unmodified LVL was prepared as described in Example 8 except that all of the veneers used in the modified LVL layup were treated with the PVA-HMMM Suc-HMMM prepolymer mixture. Pieces (25 mm×25 mm×37 mm) were cut and half of the modified and unmodified sets were leached according to EN84. The pieces were then subjected to H3 decay testing according to AWPC using three modified pieces and three unmodified pieces per fungal species and a 6 week exposure period. Leached and non-leached pieces (20 mm×25 mm×15 mm) of plywood treated with alkaline copper quat. (ACQ, 0.35% w/w) were used as H3 controls. Modification of LVL reduced decay by three typical brown rot organisms. This was particularly evident in leached samples.

Example 10

*Pinus radiata* veneers (1900 mm×1000 mm×2.5 mm) were dipped for 1 hour at ambient temperature in the PVA-HMMM Suc-HMMM prepolymer mixture described in Example 8 and dried in a veneer drier (80° C., 8 min; 60° C., 2 min; ambient temperature 2½ min). 5-Ply plywood was manufactured using with the dipped veneer place tight face up above four untreated veneers. Veneers were laid up with MUF resin, cold pressed at 9 kg/cm$^2$, then hot pressed (120° C., 106 kg/cm$^2$, 7 min). Bond strengths of treated and untreated veneers were indistinguishable. Surface hardness testing of the treated face and an untreated control was performed using the Dupont test (0.5 kg sphere dropped 0.5 m). The average indentation depth of the treated face was 1.01±0.09 mm (n=5), about half that of the untreated control (2.00±0.28 mm, n=5).

Example 11

Figure 9:
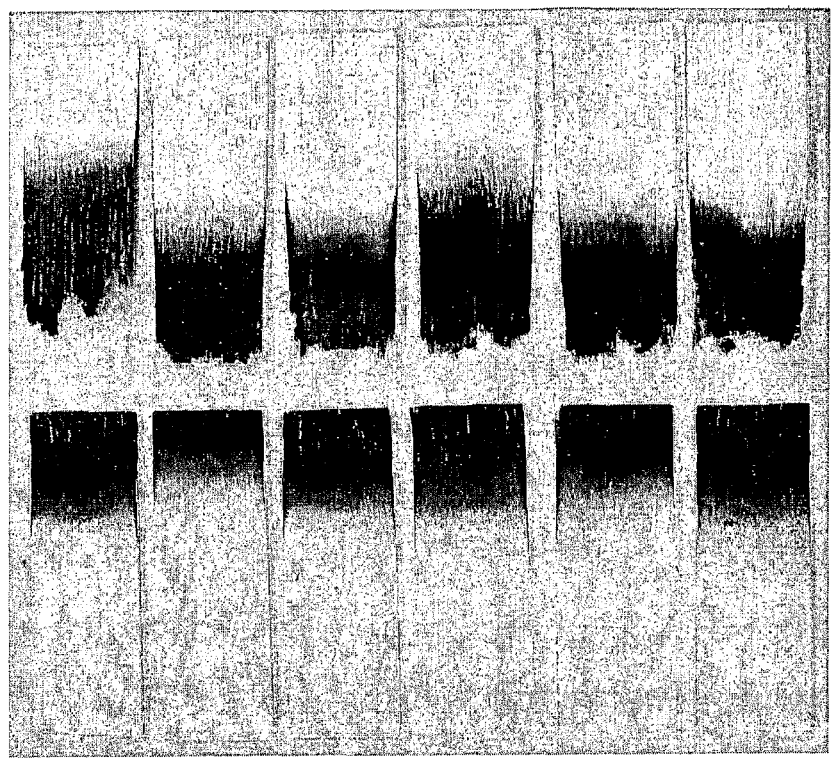
FIG. 9 is a photograph showing PVA-HMMM Suc-HMMM-treated veneers (top) and control veneers (bottom) after combustion testing.

A PVA-HMMM Suc-HMMM prepolymer mixture was prepared as summarised in Table 8 and used to vacuum impregnate 150×150×3.2 mm *Pinus radiata* veneers. The treated veneers, as well as control veneers impregnated with 0.5 g/liter Silwet 408, were dried at 30° C. for 24 hours, then hot pressed for 9 min at 130° C. The veneers were cut into 50 mm wide strips, conditioned at 20° C. and 60% RH and weighed. The pieces were held 20 cm above a Bunsen burner for 60 seconds, the flame was extinguished immediately and after cooling the pieces were reweighed and photographed (FIG. 9). The weight loss of treated veneers was 11.7±3.2%, considerably less than surfactant-treated controls (26.1±6.4%).

Example 12

Figure 10:
FIG. 10 shows surface hardness values of quartersawn timber before and after treatment with a PVA-HMMM Suc-HMMM prepolymer mixture.

A PVA-HMMM Suc-HMMM prepolymer mixture was prepared as summarised in Table 8 except that monoethanolamine was used as the base instead of ammonium hydroxide. The mixture was used to treat 4 pieces of *Pinus radiata* quartersawn timber (150 mm×20 mm×12 mm) by vacuum impregnation (30 min vacuum, admit solution, 30 min atmospheric pressure, drain solution). After partial drying for 3 hours at ambient temperature, the timber was heated at 70° C. for 64 hours. Three hardness measurements were performed on one flat face of each piece before and after treatment as described in Example 5. Prepolymer treatment increased surface hardness by an overall average of 41% (FIG. 10).

Example 13

Douglas fir veneers (350 mm×330 mm×2.5 mm (L×W×T)) were vacuum impregnated (15 min vacuum, admit solution, 15 min atmospheric pressure, drain solution) with the PVA-HMMM Suc-HMMM prepolymer mixture described in Example 12. The veneers were dried in a fan oven (30° C., >12 hours) until the moisture content registered less than 12% (Delmhorst J-LITE moisture meter). Three-ply plywood was laid up with treated face veneers and an untreated core veneer using PF resin (150 g/m$^2$) and hot pressed (5 min, 140° C., 30-60 kg/cm$^2$). Untreated plywood was made using three untreated veneers. The plywood was cut to 300 mm width, conditioned at 20° C. and 60% RH, then subjected to a four point bending test. The average MoE of treated plywood (16.2±1.8 GPa, n=7) was 15.5% greater than untreated (14.0±1.8 GPa, n=15). The average MoR of treated plywood (85.6±16.0 MPa, n=7) was 23.5% greater than untreated (69.3±15.4 MPa, n=15).

Example 14

A series of HMMM-crosslinked prepolymers based on sucrose (Suc-HMMM), lactose (Lac-HMMM), glucose (Glc-HMMM) and fructose (Fru-HMMM) were prepared as described in Table 9. To prepare Lac-HMMM it was necessary to heat the aqueous phase to 75° C. to fully dissolve lactose prior to addition of HMMM and ethanol.

TABLE 9

Composition of prepolymers.

| | Formulation | | | | |
|---|---|---|---|---|---|
| | PVA-HMMM | Suc-HMMM | Lac-HMMM | Glc-HMMM | Fru-HMMM |
| | Concentration (g/kg) | | | | |
| PVA (Poval 203) | 150 | | | | |
| Sugar | | 333 | 333 | 333 | 333 |
| Boric acid | | 4 | | 4 | 4 |
| HMMM | 100 | 167 | 167 | 167 | 167 |
| Ethanol | 100 | 167 | 167 | 167 | 167 |
| Water | 638 | 317 | 319 | 310 | 436 |
| p-TSA | 4 | 4 | 4 | 4 | 4 |
| NH$_4$OH (25% v/v) | 8 | 8 | 10 | 15 | 15 |
| Silwet 408 | 0.5 | 0.5 | 0.5 | 0.5 | 0.5 |
| Prepolymerisation conditions | 60 min 25° C. | 24 h, 25° C. | 90 min at 65° C. | 2 h, 50° C., 22 h, 25° C. | 1 h, 50° C., 15 h, 25° C. |

Figure 11:
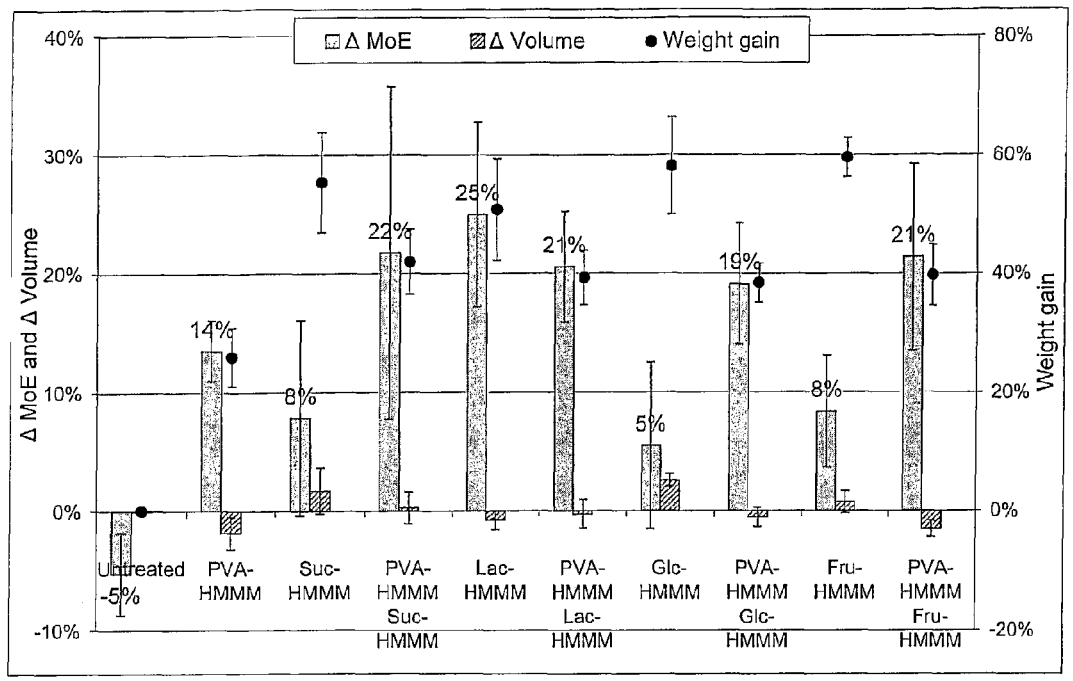
FIG. 11 shows the percentage change in MoE and volume, and the weight gain of veneers treated with PVA-HMMM in combination with various sugar-HMMM prepolymers.

Each of the sugar prepolymers was used alone and in a 1:1 mixture with PVA-HMMM (Table 9) to vacuum impregnate *Pinus radiata* veneers. After drying and hot pressing, MoE measurements were performed as described in previous examples. As shown in FIG. 11 all sugar-HMMM prepolymers increased the MoE. In all cases the sugar-HMMM prepolymer improved the strengthening effect of the PVA-HMMM prepolymer. The prepolymer mixtures also produced a smaller weight gains than the respective sugar-HMMM prepolymers alone (FIG. 11).

Example 15

Figure 12:
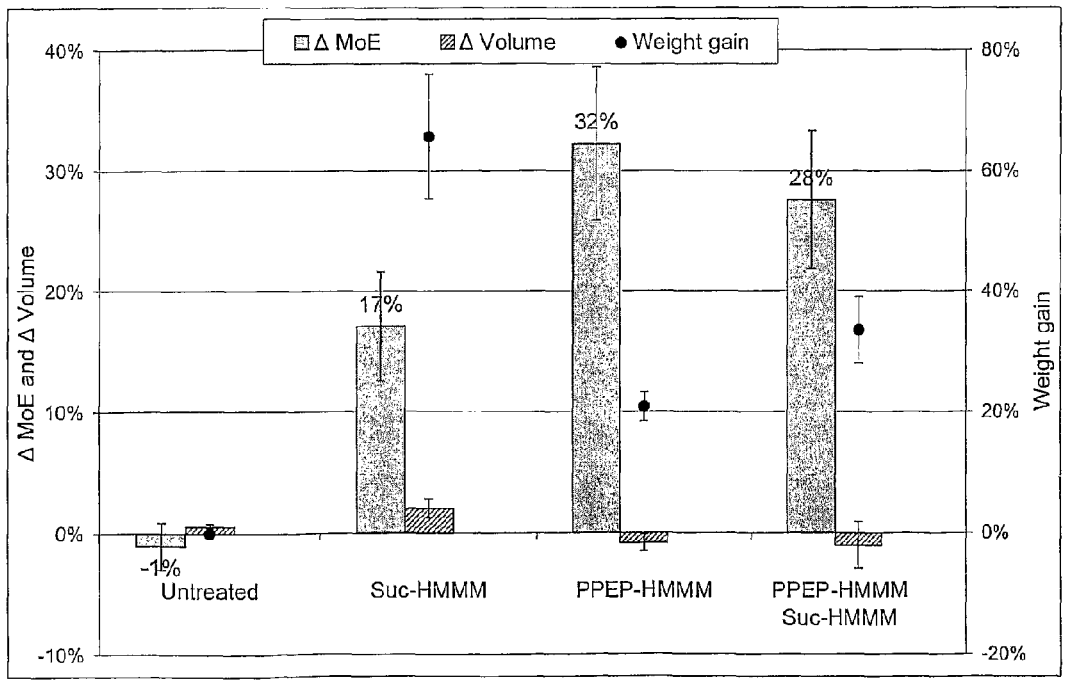
FIG. 12 shows the percentage change in MoE and volume, and the weight gain of veneers treated with PPEP-HMMM and Suc-HMMM prepolymers.

A polypeptide-HMMM prepolymer (PPEP-HMMM) was prepared from SUPRO 710 (Solae Company) as shown in Table 10. SUPRO 710 is a soy protein hydrolysate of molecular weight 2,000->50,000 with approximately 55% in the 5,000-20,000 molecular weight range. The PPEP-HMMM prepolymer remained liquid for 7-14 days. When combined 1:1 by weight with Suc-HMMM (Table 10) the shelf life of PPEP-HMMM was extended to 35 days. PPEP-HMMM and the more shelf-stable PPEP-HMMM Suc-HMMM mixture had greater strengthening effects and produced smaller weight gains than Suc-HMMM alone in the veneer MoE test (FIG. 12).

TABLE 10

Composition of prepolymers.

| | Formulation | |
|---|---|---|
| | PPEP-HMMM | Suc-HMMM |
| Component | Composition (g/kg) | |
| Soy protein (SUPRO 710) | 150 | |
| Sucrose | | 333 |
| Boric acid | | 4 |
| HMMM | 150 | 167 |
| Ethanol | 150 | 167 |
| Water | 488 | 310 |
| p-TSA | 38 | 4 |
| NH$_4$OH (25% v/v) | 24 | 15 |
| Silwet 408 | 0.5 | 0.5 |
| Prepolymerisation conditions | 60 min, 40° C. | 24 hours, 25° C. |

Example 16

Figure 13:
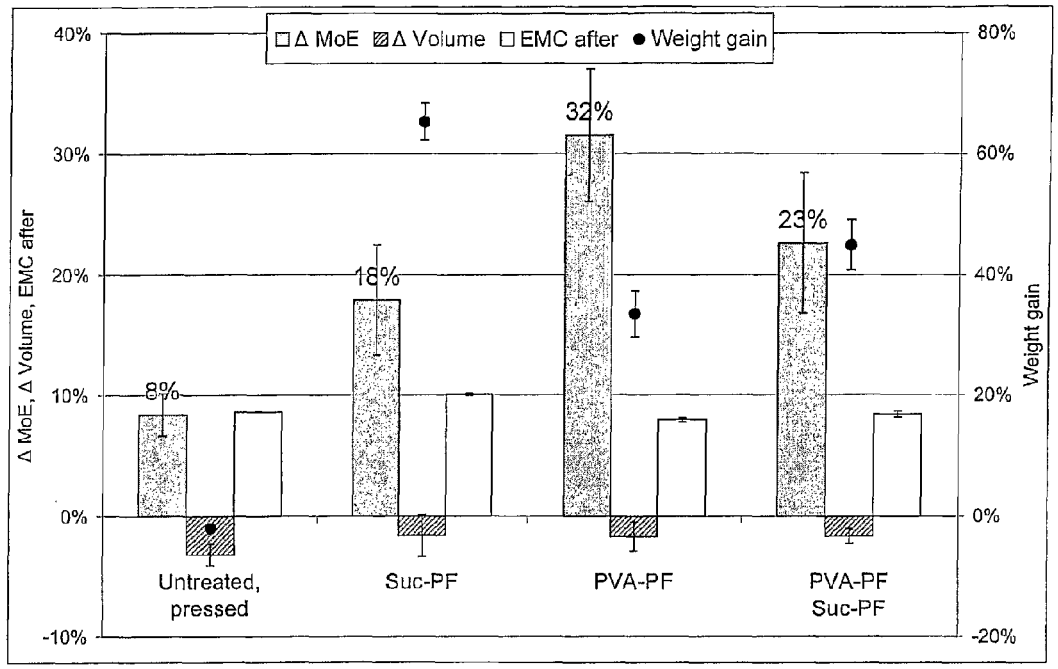
FIG. 13 shows the percentage change in MoE and volume, the final EMC and the weight gain of veneers treated with PF-crosslinked prepolymers.

Prepolymers containing PVA and sucrose were prepared using a phenol-formaldehyde resin (Prefere 13B109, Dynea) as shown in Table 11. PVA-PF remained as a solution for 3 days after which it formed a suspension containing particles (10 micron average) which grew over time. Suc-PF remained as a solution for at least 40 days. A 1:1 mixture (PVA-PF Suc-PF) remained in solution for 10 days after which it rapidly solidified. PVA-PF and the more shelf-stable PVA-PF Suc-PF mixture had greater strengthening effects and produced smaller weight gains than Suc-PF alone (FIG. 13).

TABLE 11

Composition of prepolymers.

| | Formulation | |
|---|---|---|
| | PVA-PF | Suc-PF |
| Component | Composition (g/kg) | |
| PVA (Poval 203) | 133 | |
| Sucrose | | 333 |
| PF resin (Prefere 13B109) | 333 | 333 |
| Water | 534 | 333 |
| Silwet 408 | 0.5 | 0.5 |
| Prepolymerisation conditions | 60 min, 40° C. | 24 hours, 60° C. |

Example 16A

Figure 14:
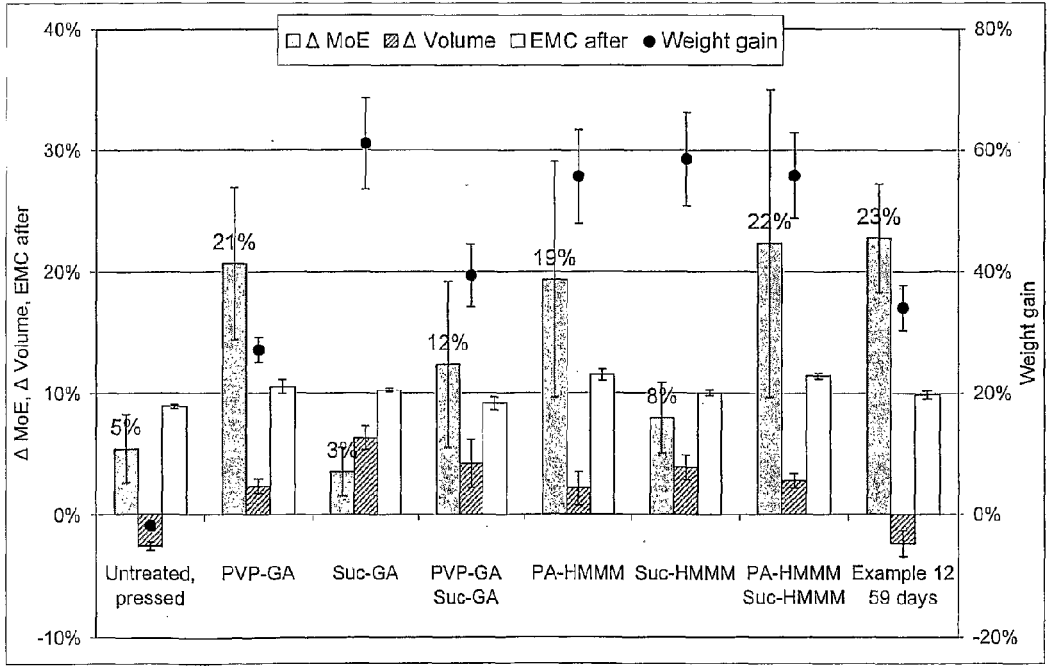
FIG. 14 shows the percentage change in MoE and volume, the final EMC and the weight gain of veneers treated with polyvinyl pyrrolidone and polyacrylic acid-based prepolymers.
Figure 15:
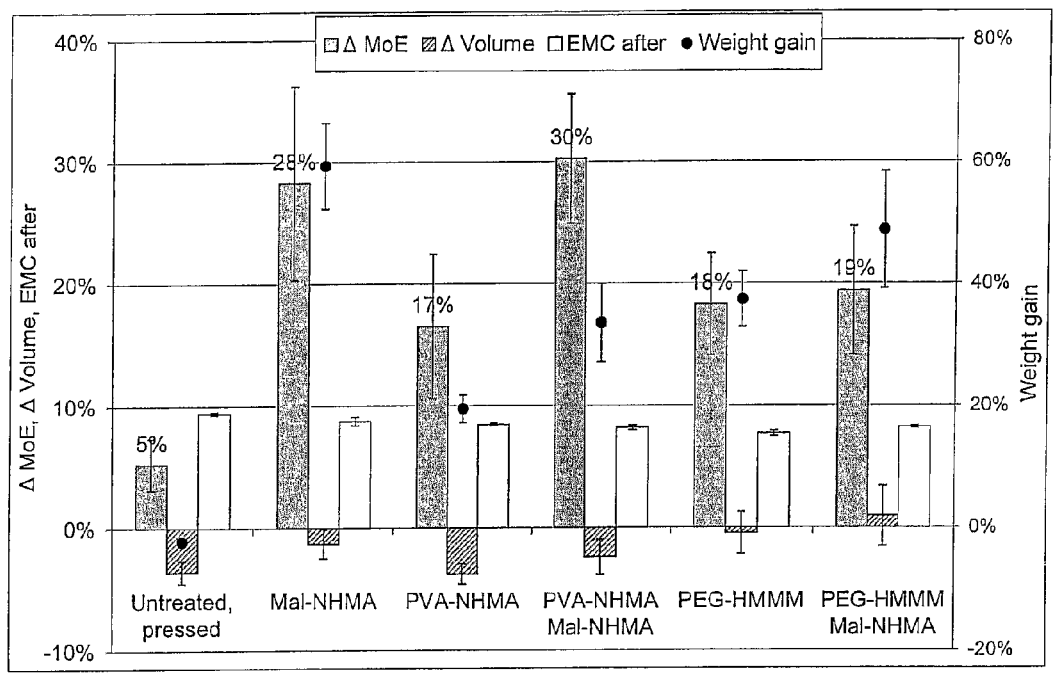
FIG. 15 shows the percentage change in MoE and volume, the final EMC and the weight gain of veneers treated with HMMM- and N-hydroxymethyl acrylamide-crosslinked prepolymers.
Figure 16:
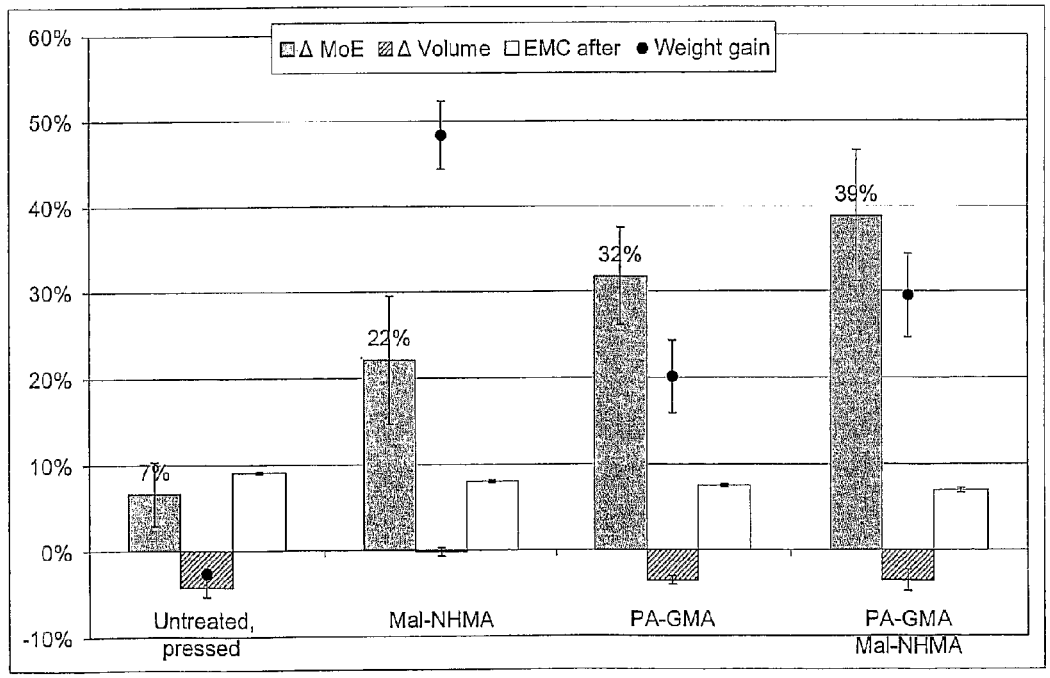
FIG. 16 shows the percentage change in MoE and volume, the final EMC and the weight gain of veneers treated with N-hydroxymethyl acrylamide- and glycidyl methacrylate-crosslinked prepolymers.

A glutaraldehyde-crosslinked polyvinyl pyrrolidone prepolymer (PVP-GA) was prepared by reacting 320 grams of a 20% (w/w) solution of PVP K-30 (average molecular weight 30,000) with 64 grams of 50% glutaraldehyde solution for 21 hours at 25° C., then adding Silwet 408 to 0.05% (w/w). Suc-GA was prepared by reacting 400 grams of a 50% (w/w) sucrose solution with 100 grams 50% glutaraldehyde in the same manner. A HMMM-crosslinked polyacrylic acid prepolymer (PA-HMMM) was prepared by reacting 303 grams of Antiprex 110 solution (average molecular weight 5,000, Ciba Specialty Chemicals) with 83 grams HMMM, 83 grams ethanol in the presence of 2 grams pTSA for 2 hours at 21° C., then terminating the reaction with 60 grams 25% NH$_4$OH and adding 21 grams water and 0.25 grams Silwet 408. A Suc-HMMM prepolymer was prepared as in Table 9 except that boric acid was omitted and monoethanolamine was used as the base. As shown in FIG. 14, both PVP-GA and PA-HMMM strengthened veneers in the MoE test and produced modest weight gains. Suc-GA was ineffective and diluted the effect of PVP-GA, whereas Suc-HMMM increased the effect of PA-HMMM. The strengthening effect of PVA-HMMM Suc-HMMM prepared as in Example 12 remained after storage of the mixture at 20° C. for 59 days (FIG. 14).

Example 17

Prepolymers based on PVA (PVA-NHMA) and maltose (Mal-NHMA) were prepared using N-hydroxymethyl acrylamide as an example of a crosslinker bearing different functionalities (amino resin-type hydroxymethyl group and vinyl group). The polymerisation inhibitor 4-methoxyphenol was used to terminate the reaction (Table 12). Polyacrylic acid (Antiprex 461, average molecular weight 5,000, Ciba Specialty Chemicals) was reacted with glycidyl methacrylate, another heterofunctional crosslinker (epoxide and acrylic groups), in a similar manner to produced PA-GMA (Table 12). A polyol, polyethylene glycol was crosslinked with HMMM (PEG-HMMM) by reacting 343 grams of an aqueous 39% (w/w) solution of PEG 3350 with 27 grams HMMM and 27 grams ethanol in the presence of 1.6 grams pTSA for 4½ hours at 25° C., then terminating the reaction with 1.5 grams monoethanolamine and adding 0.20 grams Silwet 408. As shown in FIG. 17, the NHMA-containing prepolymers all increased the MoE of veneers alone and in combination. PEG-HMMM produced similar gains in MoE to PVP-GA and PA-HMMM. The effect of PA-GMA was boosted by combining with Mal-NHMA (Table 16) accompanied by a modest increase in weight gain.

TABLE 12

Composition of prepolymers.

| | Formulation | | |
|---|---|---|---|
| | PVA-NHMA | Mal-NHMA | PA-GMA |
| | Composition (g/kg) | | |
| PVA (Poval 203) | 150 | | |
| PA (Antiprex 461) | | | 333 |
| Maltose (Avonmalt) | | 333 | |
| Boric acid | | 4 | |
| NHMA (48% solution) | 100 | 167 | |
| Glycidyl methacrylate | | | 67 |
| Water | 745 | 491 | 599 |
| p-TSA | 4 | 4 | |

TABLE 12-continued

Composition of prepolymers.

| | Formulation | | |
|---|---|---|---|
| | PVA-NHMA | Mal-NHMA | PA-GMA |
| | Composition (g/kg) | | |
| 4-Methoxyphenol | 0.06 | 0.06 | 0.06 |
| Silwet 408 | 0.5 | 0.5 | 0.5 |
| Prepolymerisation conditions | 3 h, 23° C. | 3 h, 25° C. | 24 h, 22° C. |

The present invention thus provides a method of modifying wood and wood products so as to improve one or more aspects of the wood/wood products including stiffness, strength, surface hardness, dimensional stability, water resistance, flame retardancy and biological resistance.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and methods, and illustrative examples shown and described. Accordingly, departures may be made from such details without departure from the spirit or scope of the Applicant's general inventive concept.

The invention claimed is:

1. A wood product-modifying composition comprising:
    A) a shelf-stable prepolymer formed by the reaction of:
        (i) a polyfunctional hydrophilic polymer, selected from a vinyl polymer, a polyamide, a polysaccharide, a lignin derivative, a cellulose derivative, a polyol, a polylactic acid, a polycaprolactone, and a mixture thereof, the polyfunctional hydrophilic polymer having a weight-average molecular weight of between 3,000 Da and 100,000 Da; and
        (ii) a crosslinking agent selected from an amino resin and a compound containing two or more functional groups selected from hydroxymethyl, alkoxymethyl, epoxide, vinyl, aldehyde, alcohol, carboxylic acid, ester, anhydride, acyl halide groups, and a mixture thereof; the composition being further characterized in that the ratio of said polyfunctional hydrophilic polymer to crosslinking agent is in the weight range of substantially 0.5:1 to 10:1; and
        (iii) optionally additionally comprising one or more components selected from a catalyst for promoting crosslinking, a water miscible solvent, a surfactant, a preservative and a dye, wherein the prepolymer stability ranges for a time period from 24 hours to 5 months.

2. The composition as claimed in claim 1 wherein the ratio of polyfunctional hydrophilic polymer to crosslinking agent is in the weight range of substantially 0.5:1 to 5:1.

3. The composition as claimed in claim 1 wherein the vinyl polymer is selected from a polyvinyl alcohol, polyvinyl acetate, polyvinyl pyrrolidone, polyacrylic acid, polyacrylamide, or mixtures, derivatives or salts thereof, or a copolymer of polyvinyl alcohol, polyvinyl acetate, polyvinyl pyrrolidone, polyacrylic acid, polyacrylamide and derivatives thereof, and wherein the vinyl polymer is polyvinyl alcohol having a degree of hydrolysis in the range from about 80% to about 100%.

4. The composition as claimed in claim 1 wherein the polyamide is a synthetic polyamide, a polypeptide, or derivatives thereof.

5. The composition as claimed in claim 1 wherein the amino resin is a hydroxymethyl or alkoxymethyl derivative of melamine, benzoguanamine, urea, glycoluril, dihydroxyethylene urea, acrylamide or methacrylamide.

6. The composition as claimed in claim 1 wherein the water miscible solvent is selected from an alcohol, a glycol, an ether alcohol, ester, amine, alkanolamine and amine oxide.

7. The composition as claimed in claim 6 wherein the water miscible solvent is present at substantially 0.1-60% by weight, up to a concentration that will not adversely affect the solubility of other components of the composition.

8. The composition as claimed in claim 1, further comprising:
B) a prepolymer formed by the reaction of:
  (i) a sugar selected from sucrose, maltose, lactose, trehalose, cellobiose, chitobiose, glucose, fructose, galactose, mannose, and chemical derivatives thereof; and
  (ii) a crosslinking agent selected from an amino resin and a compound containing two or more functional groups selected from hydroxymethyl, alkoxymethyl, epoxide, vinyl, aldehyde, alcohol, carboxylic acid, ester, anhydride, acyl halide groups and a mixture thereof; and
  (iii) optionally additionally comprising one or more components selected from a catalyst for promoting crosslinking, and a water miscible solvent.

9. The composition as claimed in claim 8 wherein the crosslinking agent in Part B) is an amino resin selected from a hydroxymethyl or alkoxymethyl derivative of melamine, benzoguanamine, urea, glycoluril, dihydroxyethylene urea, acrylamide and methacrylamide.

10. The composition as claimed in claim 8 wherein the ratio of sugar to crosslinking agent is in the weight range of substantially 0.5:1 to 10:1.

11. The composition as claimed in claim 8 wherein the ratio of prepolymer A) to prepolymer B) is in the weight range of substantially 0.1:1 to 10:1.

12. The composition as claimed in claim 1 wherein prepolymers A) and B) are formed in separate reactions then combined, or are formed concurrently or sequentially in the same reaction medium.

13. A wood product resulting from a method as claimed in claim 1.

14. A wood product-modifying composition comprising:
A) a shelf-stable prepolymer formed by the reaction of:
  (i) a polyfunctional hydrophilic polymer having a weight-average molecular weight of between 3,000 Da and 250,000 Da;
  (ii) a first crosslinking agent, the shelf-stable prepolymer being further characterized in that the ratio of said polyfunctional hydrophilic polymer to first crosslinking agent is in the weight range of substantially 0.5:1 to 10:1;
B) a pre-polymer formed by the reaction of
  (i) a sugar comprising at least one of a monosaccharide or a disaccharide;
  (ii) a second crosslinking agent being further characterized in that the ratio of said sugar to crosslinking agent is in the weight range of substantially 0.5:1 to 10:1;
C) a catalyst capable of promoting a crosslinking reaction for at least one of component A) and component B); and
D) a surfactant, wherein the shelf-stable prepolymer stability ranges for a time period from 24 hours to 5 months.

15. The composition as claimed in claim 14, wherein the polyfunctional hydrophilic polymer has a weight-average molecular weight of between 10,000 and 100,000 Da.

16. The composition as claimed in claim 14, wherein the surfactant is an acidic surfactant present in an amount ranging from 0.1 wt.% to 1.0 wt.% of the composition.

17. A wood product-modifying composition comprising:
A) a shelf-stable prepolymer having a composition including the reaction products of
  (i) a polyfunctional hydrophilic polymer having a weight-average molecular weight of between 10,000 Da and 100,000 Da;
  (ii) a first crosslinking agent; and
B) a catalyst capable of promoting a crosslinking reaction of component A), wherein the shelf-stable prepolymer stability ranges for a time period from 7 days to 5 months.

18. The composition as claimed in claim 17, further comprising a prepolymer having a composition including the reaction products of a second crosslinking agent with at least one of a monosaccharide and disaccharide.

19. The composition as claimed in claim 18, wherein the prepolymer composition includes at least one of the prepolymer having a sugar-melamine composition and the shelf-stable prepolymer having an alcohol-melamine composition.

20. The composition as claimed in claim 1, wherein the polyfunctional hydrophilic polymer having a weight-average molecular weight of between 10,000 Da and 100,000 Da.

* * * * *